(12) United States Patent
Yoon

(10) Patent No.: US 10,295,884 B2
(45) Date of Patent: May 21, 2019

(54) DISPLAY DEVICE

(71) Applicant: Seoul National University of Technology Center for Industry Collaboration, Seoul (KR)

(72) Inventor: Hyunsik Yoon, Gimpo-si (KR)

(73) Assignee: SEOUL NATIONAL UNIVERSITY OF TECHNOLOGY CENTER FOR INDUSTRY COLLABORATION (KR)

( * ) Notice: Subject to any disclaimer, the term of this patent is extended or adjusted under 35 U.S.C. 154(b) by 48 days.

(21) Appl. No.: 15/322,101

(22) PCT Filed: Dec. 4, 2014

(86) PCT No.: PCT/KR2014/011854
§ 371 (c)(1),
(2) Date: Dec. 23, 2016

(87) PCT Pub. No.: WO2015/199295
PCT Pub. Date: Dec. 30, 2015

(65) Prior Publication Data
US 2017/0139307 A1 May 18, 2017

(30) Foreign Application Priority Data

Jun. 26, 2014 (KR) .................. 10-2014-0078676
Nov. 17, 2014 (KR) .................. 10-2014-0160391

(51) Int. Cl.
*G02F 1/29* (2006.01)
*G02B 27/22* (2018.01)

(52) U.S. Cl.
CPC .......... *G02F 1/29* (2013.01); *G02B 27/2214* (2013.01)

(58) Field of Classification Search
CPC .. G02B 27/22; G02B 27/2214; G02B 27/126; G02B 27/2228; G02B 3/0056;
(Continued)

(56) References Cited

U.S. PATENT DOCUMENTS

| | | |
|---|---|---|
| 5,695,346 A | 12/1997 | Sekiguchi et al. |
| 7,085,060 B2 | 8/2006 | Matsushita et al. |
| 2004/0105157 A1 | 6/2004 | Matsushita et al. |

FOREIGN PATENT DOCUMENTS

| | | |
|---|---|---|
| JP | 2010243941 A | 10/2010 |
| KR | 100949226 B1 | 3/2010 |

(Continued)

OTHER PUBLICATIONS

English translation of KR 101132329, machine translated on Apr. 23, 2018.*

*Primary Examiner* — Jie Lei
(74) *Attorney, Agent, or Firm* — Renaissance IP Law Group LLP

(57) ABSTRACT

A display device is disclosed. The display panel may comprise a display panel including a pixel area and a light refraction element disposed on the display panel. The light refraction element may have a first face facing the display panel and a second face disposed at an opposite side of the first face. The light refraction element may comprise a light refraction pattern disposed at the first face and having a first slanting face and a second slanting face, and the light refraction pattern can refract light emerging from the display panel.

11 Claims, 18 Drawing Sheets

(58) Field of Classification Search
CPC . G02F 1/29; G02F 1/31; G02F 1/0356; G02F 1/1335; G02F 1/133526; H04N 13/0239; H04N 13/0404; H04N 13/0497
USPC ....... 359/315, 320, 322, 619, 620, 640, 466, 359/467, 469; 348/42, 51, 59; 349/15, 349/95
See application file for complete search history.

(56) References Cited

FOREIGN PATENT DOCUMENTS

| | | |
|---|---|---|
| KR | 20120028392 A | 3/2012 |
| KR | 101132329 B1 | 4/2012 |
| KR | 20120054195 A | 5/2012 |
| KR | 20140014938 A | 2/2014 |

* cited by examiner

DISPLAY DEVICE

TECHNICAL FIELD

The present invention relates to a display device.

BACKGROUND ART

Technology about a display device that can show glass-free 3D images or show different images according to a viewing direction has been developed recently.

In order to actualize the display device capable of showing the glass-free 3D images, the display device uses Parallax Barrier technique and Lenticular Lenslets technique, but there are problems in both techniques that brightness is low due to a barrier in the Parallax Barrier technique and it is difficult to fabricate the Lenticular Lenslets.

DISCLOSURE

Technical Problem

In order to solve the above mentioned problems, the present invention provides a 3D display device having simple structure and manufacturing process.

The present invention provides a multi-view display device having simple structure and manufacturing process.

The present invention provides a display device that can show stereoscopic or multi-view images of high quality.

The other objects of the present invention will be clearly understood by reference to the following detailed description and the accompanying drawings.

Technical Solution

A display device according to embodiments of the present invention comprises a display panel and a light refraction element disposed on the display panel. The light refraction element has a first face facing the display panel and a second face disposed at an opposite side of the first face. The light refraction element comprises a light refraction pattern disposed at the first face and having a first slanting face and a second slanting face. The light refraction pattern refracts light emerging from the display panel.

A width of the light refraction pattern becomes narrow towards the display panel. The light refraction pattern has a triangular cross section.

The display panel comprises a first pixel area disposed at a location corresponding to the first slanting face and a second pixel area disposed at a location corresponding to the second slanting face. A first light emerging from the first pixel area is incident on the first slanting face and second light emerging from the second pixel area is incident on the second slanting face.

The first light and the second light which pass through the light refraction element and emerge from the second face are different in a direction. The first light and the second light which pass through the light refraction element form 3D images or multi-view images.

The light refraction element comprises an optical film.

The display device further comprises a light refraction regulating material disposed at the first face of the light refraction element.

A recess area is defined at the first face by the first and second slanting faces, and the light refraction regulating material is disposed at the recess area.

The light refraction regulating material comprises two or more kinds of materials whose refractive indexes are different from each other.

The display device further comprises an upper transparent electrode disposed between the first face of the light refraction element and the light refraction regulating material, and a lower transparent electrode disposed on the display panel.

A refractive index of the light refraction regulating material is changed according to a control signal provided by the upper and lower transparent electrodes.

The light refraction regulating material adjusts a refraction angle and a refraction direction of the light according to a control signal provided by the upper and lower transparent electrodes.

The light refraction regulating material comprises a first light refraction regulating material and a second light refraction regulating material which are disposed at different locations of the first face. The first and second light refraction regulating materials make the light travel at different refraction angles and in different refraction directions according to a control signal provided by the upper and lower transparent electrodes.

Advantageous Effects

The display device according to embodiments of the present invention has simple structure and can be fabricated by simple manufacturing process. The display device can maintain its brightness and show stereoscopic or multi-view images by disposing a light refraction element with a light refraction pattern on the display panel. Since the light refraction element with the light refraction pattern has simple structure, it can be easily fabricated.

Furthermore, the display device can maintain its brightness and provide two or more images at different angles, and thus can easily show stereoscopic or multi-view images of high quality. The display device can be used for a glass-free type stereoscopic display device where users can watch stereoscopic images without glasses.

BEST MODE

Figure 1:
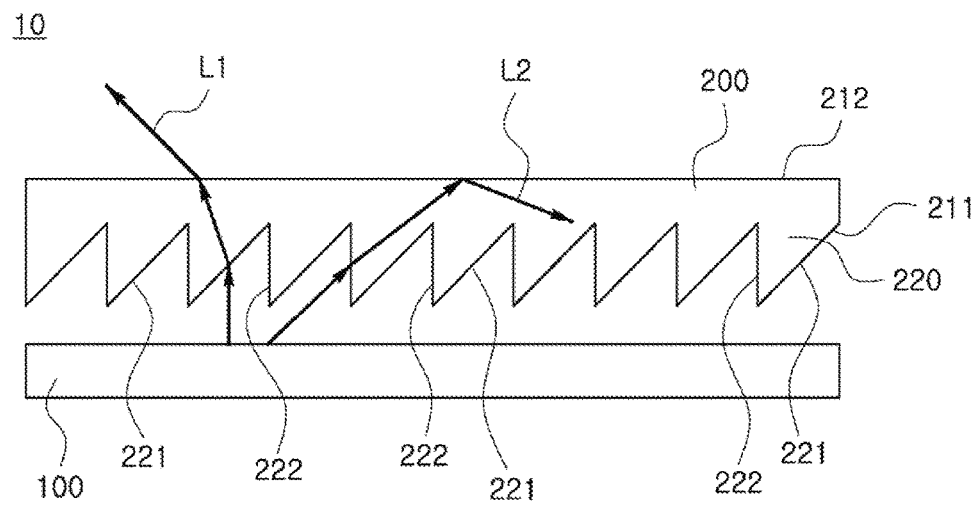
FIG. 1 is a cross sectional view schematically illustrating a display device according to an embodiment of the present invention.

Hereinafter, a detailed description will be given of the present invention with reference to the following embodiments. The purposes, features, and advantages of the present invention will be easily understood through the following embodiments. The present invention is not limited to such embodiments, but may be modified in other forms. The embodiments to be described below are nothing but the ones provided to bring the disclosure of the present invention to perfection and assist those skilled in the art to completely understand the present invention. Therefore, the following embodiments are not to be construed as limiting the present invention.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

It will be understood that when an element is referred to as being "on" another element, it can be directly on the other element or intervening elements may be present therebetween. In contrast, when an element is referred to as being "directly on" another element, there are no intervening elements present.

The size of the element or the relative sizes between elements in the drawings may be shown to be exaggerated for more clear understanding of the present invention. In addition, the shape of the elements shown in the drawings may be somewhat changed by variation of the manufacturing process or the like. Accordingly, the embodiments disclosed herein are not to be limited to the shapes shown in the drawings unless otherwise stated, and it is to be understood to include a certain amount of variation.

Figure 2:
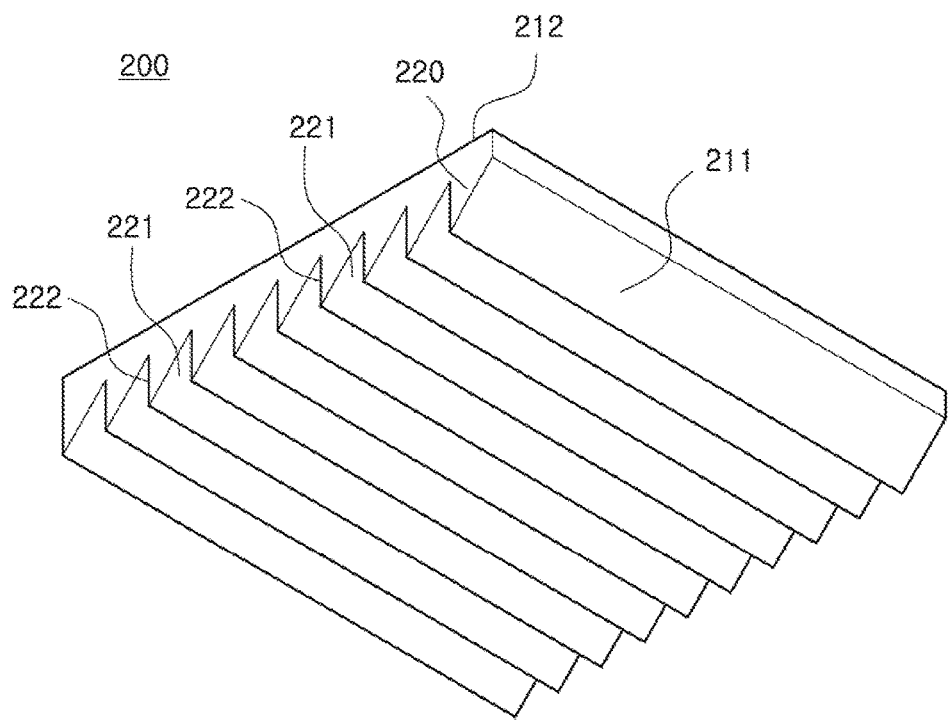
FIG. 2 is a perspective view of a light refraction element according to an embodiment of the present invention.
Figure 3:
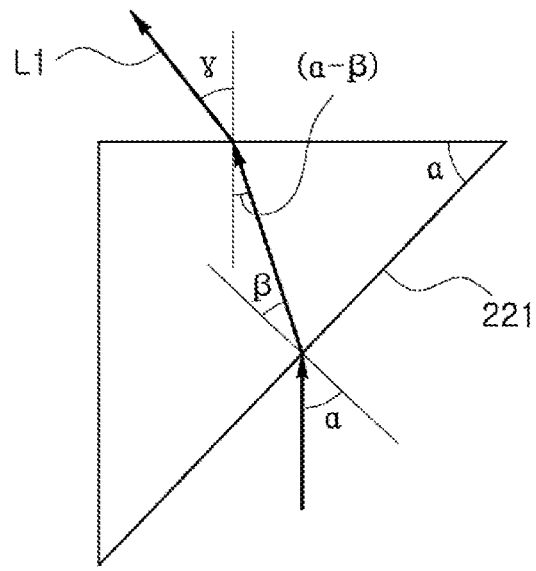
FIG. 3 shows a direction of a light passing through the light refraction element of FIG. 2.

FIG. 1 is a cross sectional view schematically illustrating a display device according to an embodiment of the present invention, FIG. 2 is a perspective view of a light refraction element according to an embodiment of the present invention, and FIG. 3 shows a direction of a light passing through the light refraction element of FIG. 2.

Referring to FIGS. 1 to 3, a display device 10 may include a display panel 100 and a light refraction element 200.

The display panel 100 may be a panel that can be used in various display devices such as a LCD device, a LED device, an OLED device, a PDP device, a projection display device and a holographic display device, etc.

The light refraction element 200 may have a first face 211 facing the display panel 100 and a second face 212 disposed at an opposite side of the first face 211. The light refraction element 200 may have a plurality of light refraction patterns 220 disposed at the first face 211. The light refraction pattern 220 may have a first slanting face 221 and a second slanting face 222. The first slanting face 221 may make an acute angle with the display panel 100, and the second slanting face 222 may be perpendicular to the display panel 100. In a direction where a plurality of the light refraction patterns 220 are arranged, a width of a cross section of the light refraction pattern 220 may become narrow towards the display panel 100. The cross section of the light refraction pattern 220 may be a right triangle. The light refraction element 200 may be an optical film as an example. In addition, the light refraction element 220 may be formed by PET (polyethylene terephthalate), PMMA (polymethyl methacrylate), poly(pentabromophenyl methacrylate), polythiomethacrylate, polycarbonate, a high molecular substance with a polarizing property and nanocomposite, etc. The nanocomposite may be formed by dispersing nanoparticles (for example, titanium dioxide nanoparticles) in a high molecule (for example, polyimide).

A first light L1 emerging out from the display panel 100 travels into the first slanting face 221 to be refracted. After the refraction, the first light L1 passes through the light refraction element 200 and emerges from the second face 212 so that it can show images in a predetermined direction (for example, a left direction). Second light L2 emerging from the display panel 100 travels into the second slanting face 222 to be refracted. After the refraction, the second light L2 fails to pass through the second face 212 and is refracted inside the light refraction element 200 so that it cannot show images. Thus, the first light L1 emerging from the display panel 100 is refracted by the light refraction pattern 220 and passes through the light refraction element 200 so that it can show images in the predetermined direction, but the second light L2 is refracted by the light refraction pattern 220 and fails to pass through the light refraction element 200 so that it cannot show images. In other words, the light refraction pattern 220 of the light refraction element 200 selectively refracts the light emerging from the display panel 100 and thus can show images in the predetermined direction.

Figure 4:
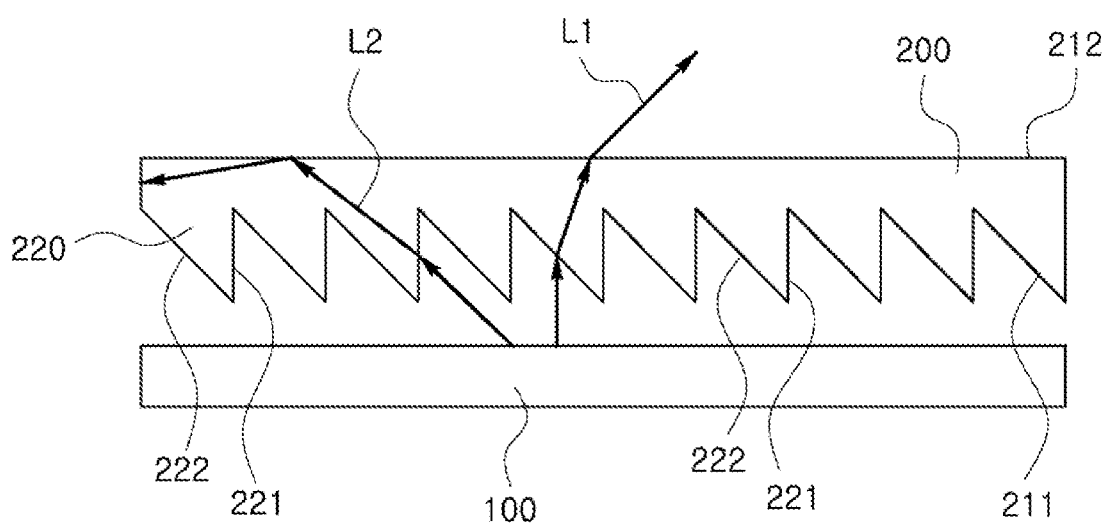
FIG. 4 is a cross sectional view schematically illustrating a display device according to another embodiment of the present invention.
Figure 5:
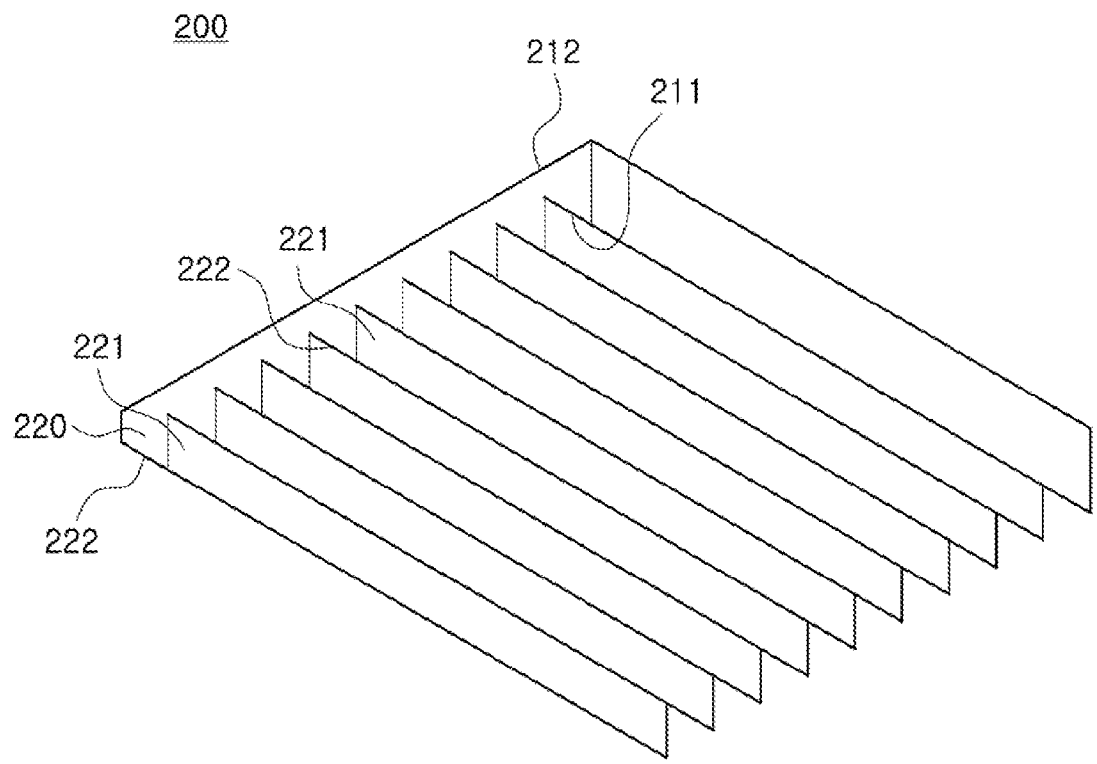
FIG. 5 is a perspective view of a light refraction element according to another embodiment of the present invention.

FIG. 4 is a cross sectional view schematically illustrating a display device according to another embodiment of the present invention, FIG. 5 is a perspective view of a light refraction element according to another embodiment of the present invention.

Referring to FIGS. 4 and 5, a display panel 100 may be a panel that can be used in various display devices such as a LCD device, a LED device, an OLED device, a PDP device, a projection display device and a holographic display device, etc.

A light refraction element 200 may have a first face 211 facing the display panel 100 and a second face 212 disposed at an opposite side of the first face 211. The light refraction element 200 may have a plurality of light refraction patterns 220 disposed at the first face 211. The light refraction pattern 220 may have a first slanting face 221 and a second slanting face 222. The first slanting face 221 may be perpendicular to the display panel 100, and the second slanting face 222 may make an acute angle with the display panel 100. In a direction where a plurality of the light refraction patterns 220 are arranged, a width of a cross section of the light refraction pattern 220 may become narrow towards the display panel 100. The cross section of the light refraction pattern 220 may be a right triangle. The light refraction element 200 may be an optical film as an example. In addition, the light refraction element 200 may be formed by PET, PMMA, poly(pentabromophenyl methacrylate), polythiomethacrylate, polycarbonate, a high molecular substance with a polarizing property and nanocomposite, etc. The nanocomposite may be formed by dispersing nanoparticles (for example, titanium dioxide nanoparticles) in a high molecule (for example, polyimide).

A first light L1 emerging from the display panel 100 travels into the second slanting face 222 and is refracted. After the refraction, the first light L1 passes through the light refraction element 200 and emerges from the second face 212 so that it can show images in a predetermined direction (for example, a right direction). Second light L2 emerging from the display panel 100 travels into the first slanting face 221 and is refracted. After the refraction, the second light L2 fails to pass through the second face 212 and is refracted inside the light refraction element 200 so that it cannot show images. Thus, the first light L1 emerging from the display panel 100 is refracted by the light refraction pattern 220 and passes through the light refraction element 200 so that it can show images in the predetermined direction, but the second light L2 is refracted by the light refraction pattern 220 and fails to pass through the refraction element 200 so that it cannot show images. In other words, the light refraction pattern 220 of the light refraction element 200 selectively refracts lights emerging from the display panel 100 and thus can show images in the predetermined direction.

Figure 6:
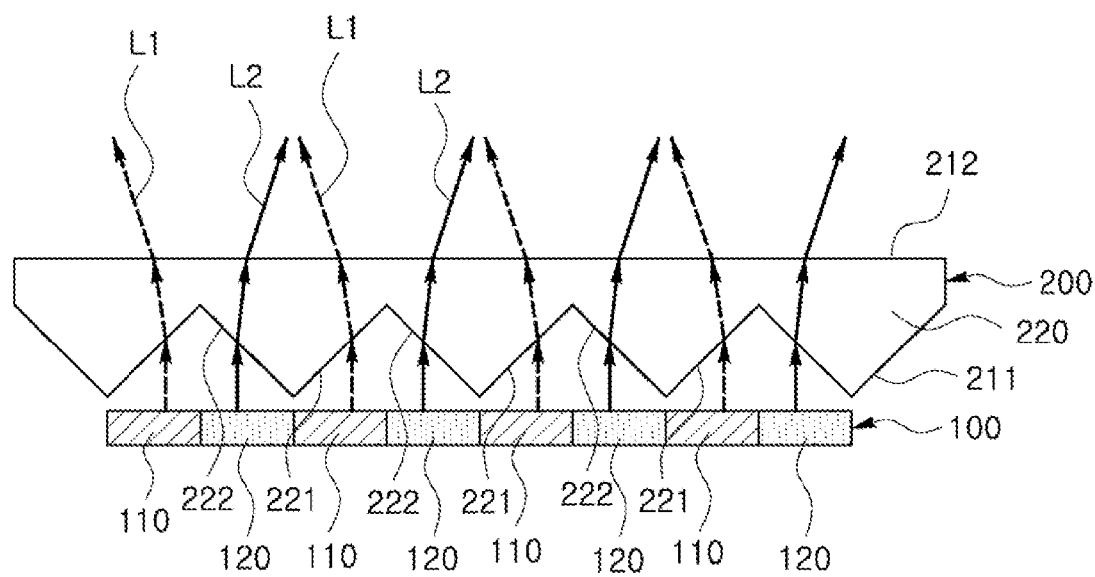
FIG. 6 is a cross sectional view schematically illustrating a display device according to yet another embodiment of the present invention.
Figure 7:
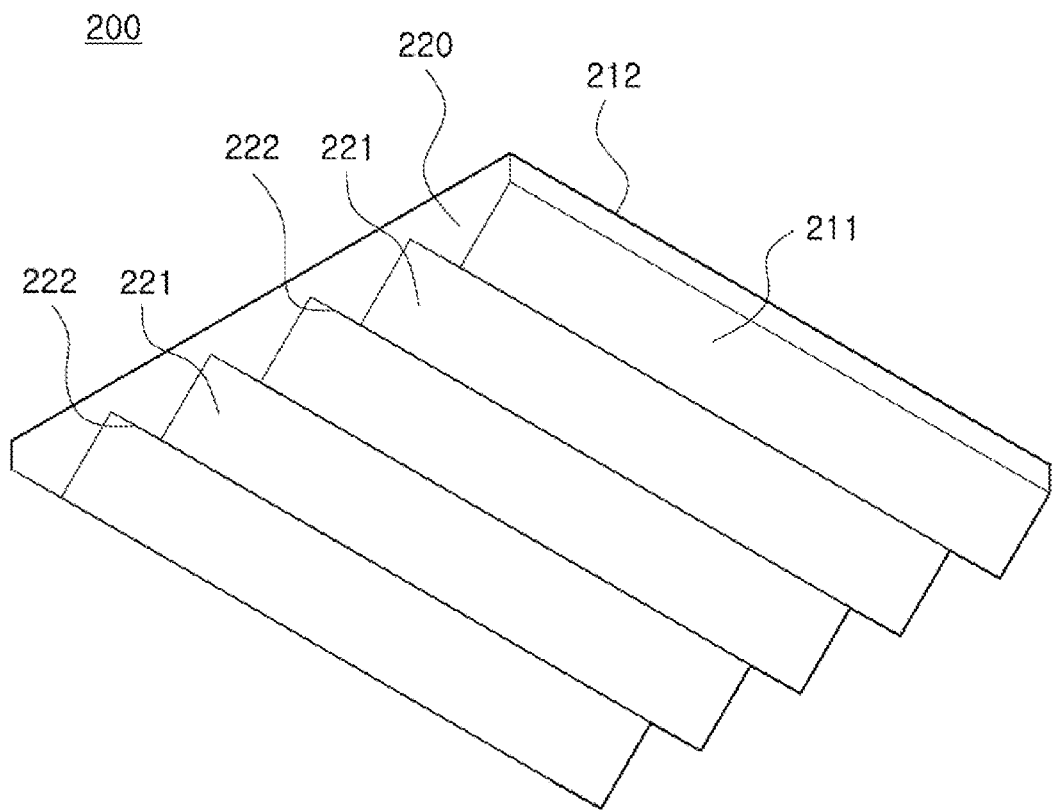
FIG. 7 is a perspective view of a light refraction element according to yet another embodiment of the present invention.

FIG. 6 is a cross sectional view schematically illustrating a display device according to yet another embodiment of the present invention, and FIG. 7 is a perspective view of a light refraction element according to yet another embodiment of the present invention.

Referring to FIGS. 6 and 7, a display panel 100 may be a panel that can be used in various display devices such as a LCD device, a LED device, an OLED device, a PDP device, a projection display device and a holographic display device, etc. The display panel 100 may include a first pixel area 110 and a second pixel area 120.

A light refraction element 200 may have a first face 211 facing the display panel 100 and a second face 212 disposed at an opposite side of the first face 211. The light refraction element 200 may have a plurality of light refraction patterns 220 disposed at the first face 211. The light refraction pattern 220 may have a first slanting face 221 and a second slanting face 222. The first slanting face 221 and the second slanting face 222 may make an acute angle with the display panel 100. The first slanting face 221 may be disposed at a location corresponding to the first pixel area 110, and the second slanting face 222 may be disposed at a location corresponding to the second pixel area 120. In a direction where a plurality of the light refraction patterns 220 are arranged, a width of a cross section of the light refraction pattern 220 may become narrow towards the display panel 100. The cross section of the light refraction pattern 220 may be an isosceles triangle. The light refraction element 200 may be an optical film as an example. In addition, the light refraction element 200 may be formed by PET, PMMA, poly(pentabromophenyl methacrylate), polythiomethacrylate, polycarbonate, a high molecular substance with a polarizing property and nanocomposite, etc. The nanocomposite may be formed by dispersing nanoparticles (for example, titanium dioxide nanoparticles) in a high molecule (for example, polyimide).

A first light L1 emerging from the first pixel area 110 travels into the first slanting face 221 and is refracted. After the refraction, the first light L1 passes through the light refraction element 200 and emerges from the second face 212 so that it can show images in a predetermined direction (for example, a left direction). A second light L2 emerging from the second pixel area 120 travels into the second slanting face 222 and is refracted. After the refraction, the second light L2 passes through the light refraction element 200 and emerges from the second face 212 so that it can show images in a predetermined direction (for example, a right direction). Thus, each of the first light L1 and the second light L2 emerging from the display panel 100 is refracted by the light refraction pattern 220 and passes through the light refraction element 200 so that they can show images in two different directions. In other words, the light refraction pattern 220 of the light refraction element 200 selectively refracts lights emerging from the display panel 100 and thus can show images in two different directions. The images shown in two different directions can be used as 3D images or multi-view images that are identical to or different from each other.

As an exemplary embodiment, the display device 10 can show glass-free 3D images by combining images of the left direction and images of the right direction. As another exemplary embodiment, the display device 10 can show multi-view images in a car. For example, the multi-view images which may be identical to or different from each other can be shown in two directions, where the one is a direction of a driver's seat and the other is a direction of a passenger seat. When the multi-view images are identical to each other, the display device 10 is better in visibility in comparison with display devices of prior arts showing only single images. In addition, when the multi-view images are different from each other, navigation map images may be shown in the direction of a driver's seat and DMB images may be shown in the direction of a passenger seat. Since those multi-view images are not generated by a split-screen, sizes of images are not reduced and can be maintained identically to the screen size of the display device. If the split-screen is adapted to the display device of this embodiment, various multi-view images can be shown.

Figure 8:
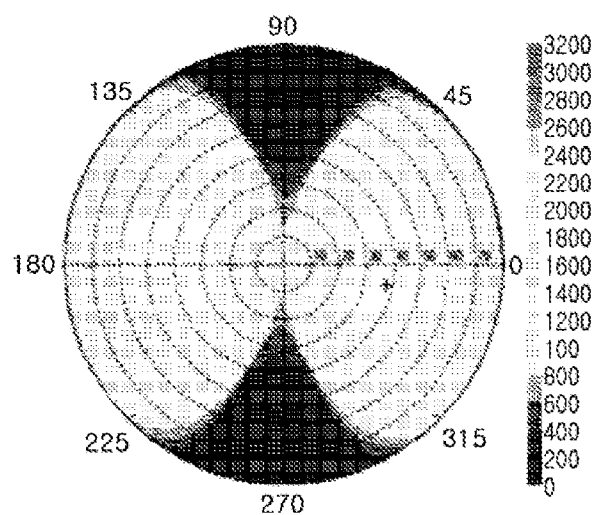
FIG. 8 illustrates an example of images shown by the display device of FIG. 6.

FIG. 8 illustrates an example of images shown by the display device of FIG. 6.

Referring to FIGS. 6 and 8, the first light L1 and the second light L2 emerging from the first pixel area 110 and the second pixel area 120 of the display panel 100 can be refracted by the light refraction patterns 220 of the light refraction element 200 and divided to travel in both sides.

Figure 9:
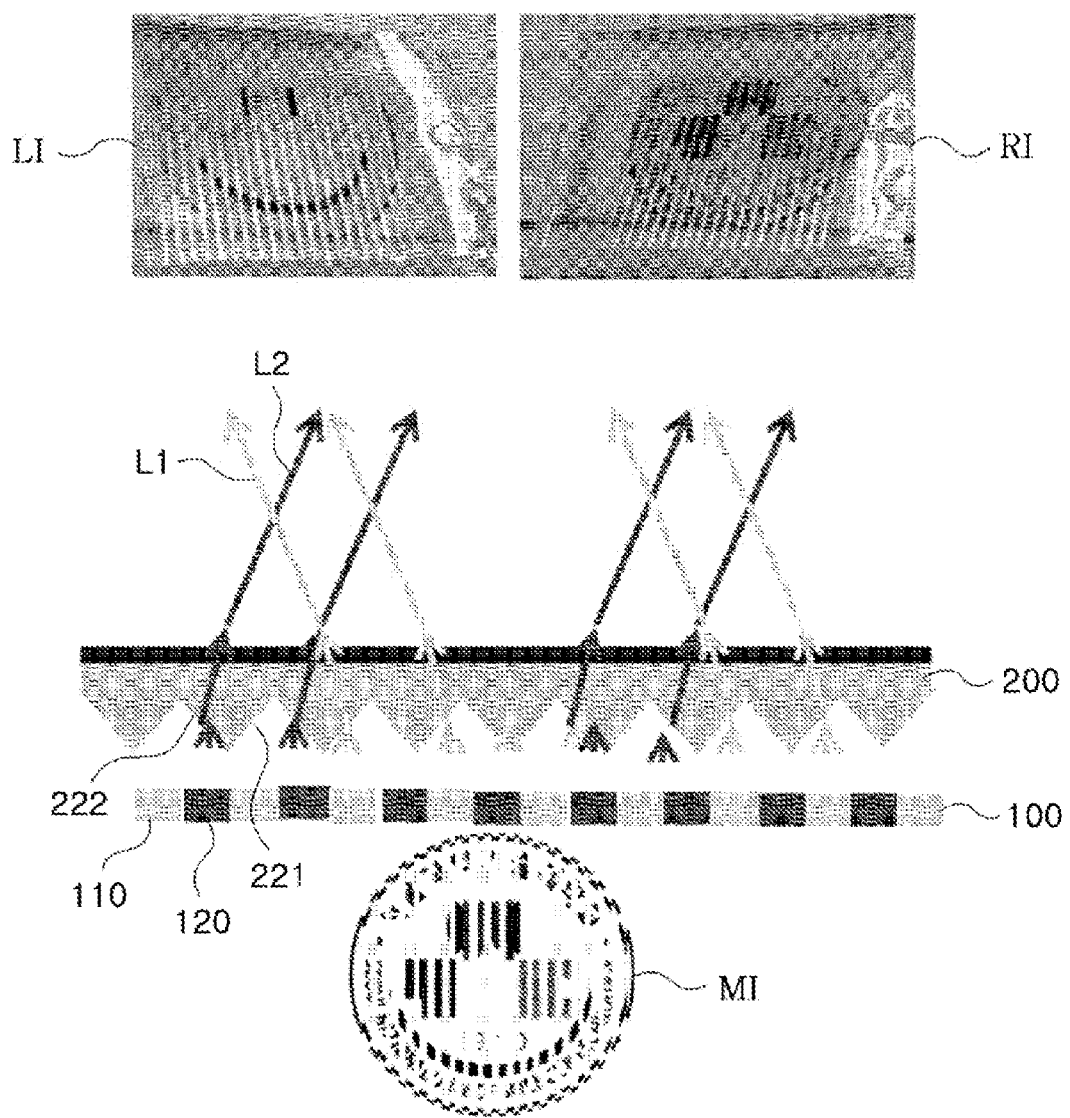
FIG. 9 illustrates an example of multi-view images shown by the display device of FIG. 6.

FIG. 9 illustrates an example of multi-view images shown by the display device of FIG. 6.

Referring to FIGS. 6 and 9, the light refraction element 200 can divide mixed images generated by the display panel 100 to show first images L1 and second images R1. The first light L1 emerging from the first pixel area 110 travels into the first slanting face 221 and is refracted. After the refraction, the first light L1 passes through the light refraction element 200 and emerges from the second face 212 so that it can show the first images L1 in the left direction. The second light L2 emerging from the second pixel area 120 travels into the second slanting face 222 and is refracted. After the refraction, the second light L2 passes through the light refraction element 200 and emerges from the second face 212 so that it can show the second images R1 in the right direction.

Figure 10:
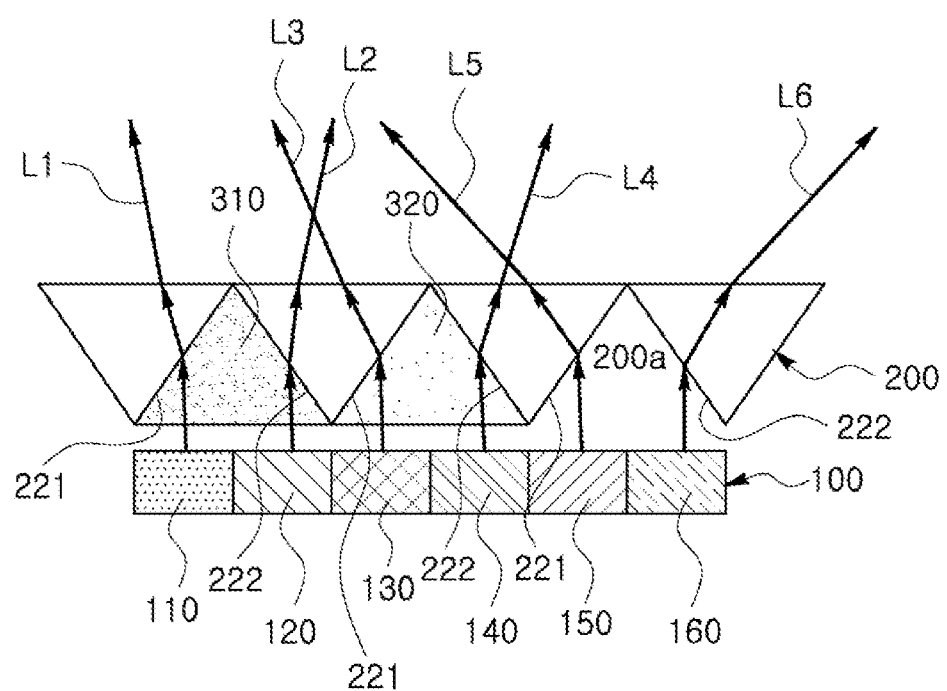
FIG. 10 is a cross sectional view schematically illustrating a yet another display device of the present invention.

FIG. 10 is a cross sectional view schematically illustrating a yet another display device of the present invention.

Referring to FIG. 10, a display panel 100 may be a panel that can be used in various display devices such as a LCD device, a LED device, an OLED device, a PDP device, a projection display device and a holographic display device, etc. The display panel 100 may include a first pixel area 110, a second pixel area 120, a third pixel area 130, a fourth pixel area 140, a fifth pixel area 150 and a sixth pixel area 160.

A light refraction element 200 may have a first face 211 facing the display panel 100 and a second face 212 disposed at an opposite side of the first face 211. The light refraction element 200 may have a plurality of light refraction patterns 220 disposed at the first face 211. The light refraction patterns 220 may have a first slanting face 221 and a second slanting face 222. The first slanting face 221 and the second slanting face 222 may make an acute angle with the display panel 100. A plurality of the first slanting faces 221 may be disposed at locations corresponding to the first pixel area 110, the third pixel area 130 and the fifth pixel area 150, respectively. A plurality of the second slanting faces 222 may be disposed at locations corresponding to the second pixel area 120, the fourth pixel area 140 and the sixth pixel area 160, respectively. In a direction where a plurality of the light refraction patterns 220 are arranged, a width of a cross section of the light refraction pattern 220 may become narrow towards the display panel 100. The cross section of the light refraction pattern 220 may be an isosceles triangle. A first light refraction regulating material 310 or a second light refraction regulating material 320 whose refractive index is not different from that of the light refraction element 200, may be disposed or not disposed at areas 200a between the light refraction patterns 220.

A first light L1 emerging from the first pixel area 110 may pass through the first light refraction regulating material 310 and travel into the first slanting face 221 to pass through the light refraction element 200. A second light L2 emerging from the second pixel area 120 may pass through the first light refraction regulating material 310 and may travel into the second slanting face 222 to pass through the light refraction element 200. A third light L3 emerging from the third pixel area 130 may pass through the second light refraction regulating material 320 and travel into the first slanting face 221 to pass through the light refraction element 200. A fourth light L4 emerging from the forth pixel area 140 may pass through the second light refraction regulating material 320 and may travel into the second slanting face 222 to pass through the light refraction element 200. A fifth light L5 emerging from the fifth pixel area 150 may travel into the first slanting face 221 to pass through the light refraction element 200. A sixth light L6 emerging from the sixth pixel area 160 may travel into the second slanting face 222 to pass through the light refraction element 200. The first light to the sixth light L1-L6 passing through the light refraction element 200 may travel in six different directions so that images by the light traveled in the different directions can be used as 3D images or various multi-view images.

Figure 11:
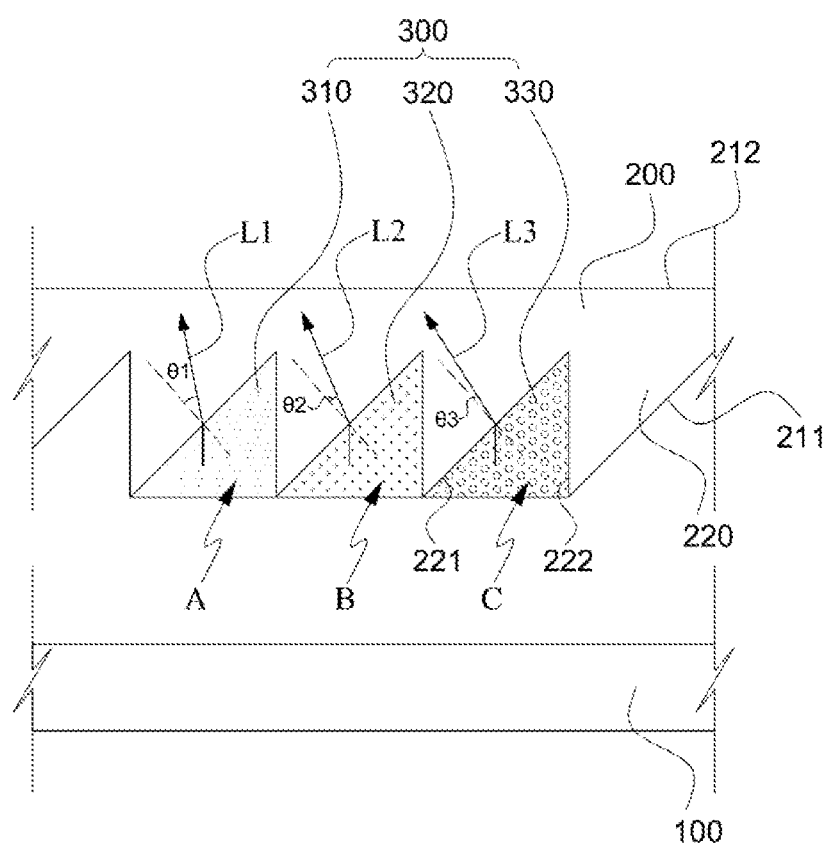
FIG. 11 is a cross sectional view schematically illustrating a display device according to yet another embodiment of the present invention.

FIG. 11 is a cross sectional view schematically illustrating a display device according to yet another embodiment of the present invention.

Referring to FIG. 11, the display device 10 may include a display panel 100, a light refraction element 200 and light refraction regulating material 300.

The display panel 100 may be a panel that can be used in various display devices such as a LCD device, a LED device, an OLED device, a PDP device, a projection display device and a holographic display device, etc.

A light refraction element 200 may have a first face 211 facing the display panel 100 and a second face 212 disposed at an opposite side of the first face 211. The light refraction element 200 may have a plurality of light refraction patterns 220 disposed at the first face 211. The light refraction pattern 220 may have a first slanting face 221 and a second slanting face 222. The first slanting face 221 may make an acute angle with the display panel 100, and the second slanting face 222 may be perpendicular to the display panel 100. In a direction where a plurality of the light refraction patterns 220 are arranged, a width of a cross section of the light refraction pattern 220 may become narrow towards the display panel 100. The cross section of the light refraction pattern 220 may be a right triangle. A plurality of recess areas (for example, a first recess area A, a second recess area B and a third recess area C) defined by the first slanting face 221 and the second slanting face 222 may be disposed at the first face 211. The light refraction element 200 may be an optical film as an example. In addition, the light refraction element 200 may be formed by PET, PMMA, poly(pentabromophenyl methacrylate), polythiomethacrylate, polycarbonate, a high molecular substance with a polarizing property and nanocomposite, etc. The nanocomposite may be formed by dispersing nanoparticles (for example, titanium dioxide nanoparticles) in a high molecule (for example, polyimide).

The light refraction regulating material 300 is disposed at the recess areas A, B and C. The light refraction regulating material 300 may include two or more kinds of light refraction regulating material (for example, a first light refraction regulating material 310, a second light refraction regulating material 320 and a third light refraction regulating material 330). The light refraction regulating material 300 may include ethanol, water, fluorocarbon, silicon oil, fluorine oil, liquid crystal, photochromic material, etc. In the present embodiment, the light refraction regulating material 300 includes three kinds of light refraction regulating materials, but it is not limited to this. Considering images (stereoscopic images) shown by the display device 10, the number and kind of the light refraction regulating materials can be selected moderately. The first light refraction regulating material 310 may be disposed at the first recess area A, the second light refraction regulating material 320 may be disposed at the second recess area B, and the third light refraction regulating material 330 may be disposed at the third recess area C. The recess areas A, B and C may be partially or fully filled with the refraction regulating material 300.

The light refraction regulating material 300 may refract light passing therethrough, and refractive indexes of the first light refraction regulating material 310, the second light refraction regulating material 320 and the third light refraction regulating material 330 may be different from each other. Therefore, the first light refraction regulating material 310, the second light refraction regulating material 320 and the third light refraction regulating material 330 can refract light at different angles and in different directions.

First, second and third light L1, L2 and L3 emerging from the display panel 100 pass through the light refraction element and form stereoscopic images. The first light L1 passes through the first light refraction regulating material 310 to be refracted by the first slanting face 221, the second light L2 passes through the second light refraction regulating material 320 to be refracted by the first slanting face 221, and the third light L3 passes through the third light refraction regulating material 330 to be refracted by the first slanting face 221. The first light L1 may be refracted by the first slanting face 221 at a first refraction angle θ1, the second light L2 may be refracted by the first slanting face 221 at a second refraction angle θ2, and the third light L3 may be refracted by the first slanting face 221 at third refraction angle θ3. In other words, the first, second and third light L1, L2 and L3 emerging from the display panel 100 are refracted at different angles by the light refraction regulating material 300 in the light refraction element 200, and thus can generate stereoscopic images.

Figure 12:
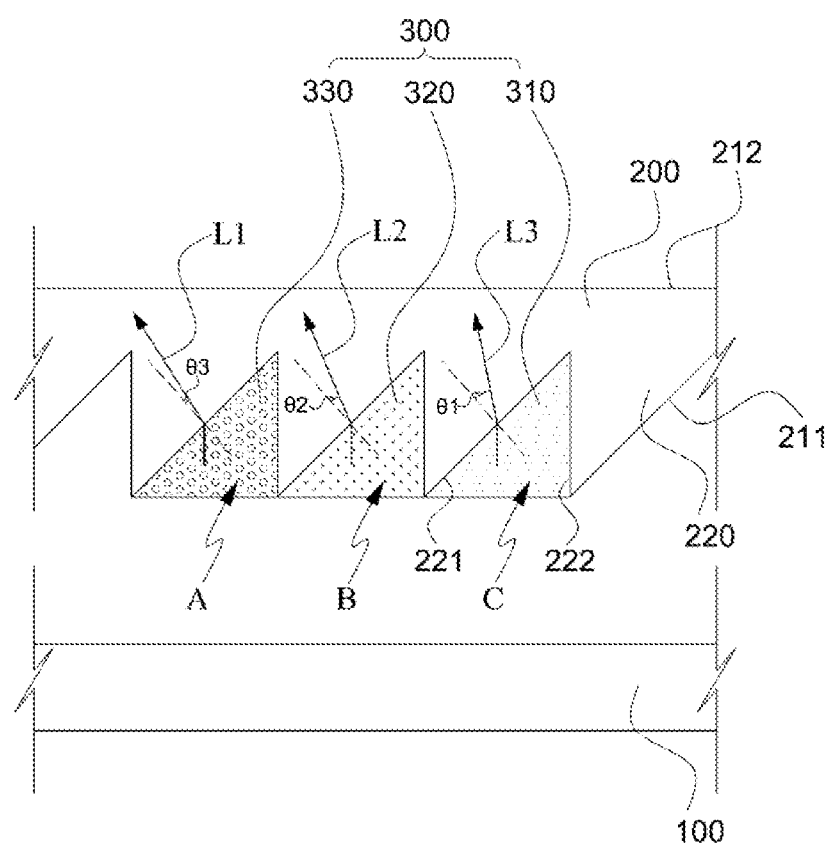
FIG. 12 is a cross sectional view schematically illustrating a display device according to yet another embodiment of the present invention.

FIG. 12 is a cross sectional view schematically illustrating a display device according to yet another embodiment of the present invention.

Referring to FIG. 12, the disposition of a light refraction regulating material 300 in the present embodiment may be different from that of the light refraction regulating material 300 in the previous embodiment. A first light refraction regulating material 310 may be disposed at a third recess area C, a second light refraction regulating material 320 may be disposed at the second recess area B, and a third light refraction regulating material 330 may be disposed at the first recess area A. The recess areas A, B and C may be partially or fully filled with the refraction regulating material 300.

The light refraction regulating material 300 may refract light passing therethrough, and refractive indexes of the first light refraction regulating material 310, the second light refraction regulating material 320 and the third light refraction regulating material 330 may be different from each other. Therefore, the first light refraction regulating material 310, the second light refraction regulating material 320 and the third light refraction regulating material 330 can refract light at different angles and in different directions.

First, second and third light L1, L2 and L3 emerging from the display panel 100 pass through the light refraction element and form stereoscopic images. The first light L1 passes through the third light refraction regulating material 330 to be refracted by the first slanting face 221, the second light L2 passes through the second light refraction regulating material 320 to be refracted by the first slanting face 221, and the third light L3 passes through the first light refraction regulating material 310 to be refracted by the first slanting face 221. The first light L1 may be refracted by the first slanting face 221 at a first refraction angle θ3, the second light L2 may be refracted by the first slanting face 221 at a second refraction angle θ2, and the third light L3 may be refracted by the first slanting face 221 at a third refraction angle θ1. In other words, the first, second and third light L1, L2 and L3 emerging from the display panel 100 are refracted at different angles by the light refraction regulating material 300 in the light refraction element 200, and thus can generate stereoscopic images.

Figure 13:
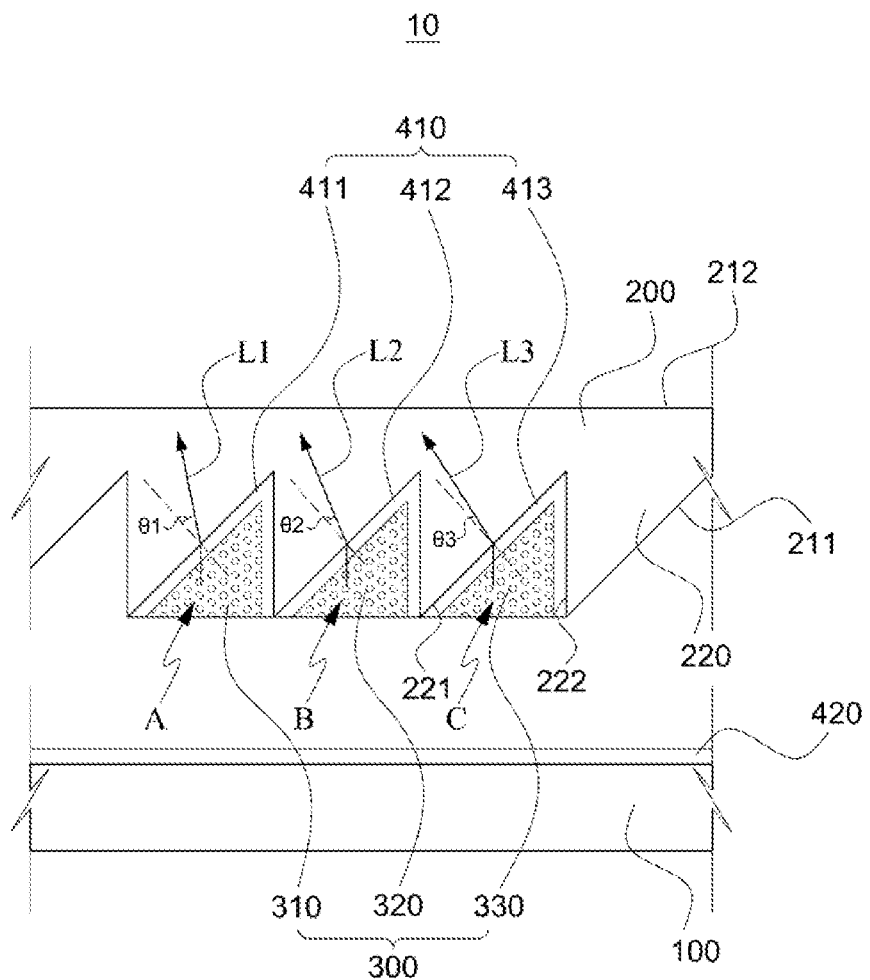
FIG. 13 is a cross sectional view schematically illustrating a display device according to yet another embodiment of the present invention.

FIG. 13 is a cross sectional view schematically illustrating a display device according to yet another embodiment of the present invention.

Referring to FIG. 13, the display device 10 may include a display panel 100, a light refraction element 200, light refraction regulating material 300, an upper transparent electrode and a lower transparent electrode.

The display panel 100 may be a panel that can be used in various display devices such as a LCD device, a LED device, an OLED device, a PDP device, a projection display device and a holographic display device, etc.

A light refraction element 200 may have a first face 211 facing the display panel 100 and a second face 212 disposed at an opposite side of the first face 211. The light refraction element 200 may have a plurality of light refraction patterns 220 disposed at the first face 211. The light refraction pattern 220 may have a first slanting face 221 and a second slanting face 222. The first slanting face 221 may make an acute angle with the display panel 100, and the second slanting face 222 may be perpendicular to the display panel 100. In a direction where a plurality of the light refraction patterns 220 are arranged, a width of a cross section of the light refraction pattern 220 may become narrow towards the display panel 100. The cross section of the light refraction pattern 220 may be a right triangle. A plurality of recess areas (for example, a first recess area A, a second recess area B and a third recess area C) defined by the first slanting face 221 and the second slanting face 222 may be disposed at the first face 211. The light refraction element 200 may be an optical film as an example. In addition, the light refraction element 200 may be formed by PET, PMMA, poly(pentabromophenyl methacrylate), polythiomethacrylate, polycarbonate, a high molecular substance with a polarizing property and nanocomposite, etc. The nanocomposite may be formed by dispersing nanoparticles (for example, titanium dioxide nanoparticles) in a high molecule (for example, polyimide).

The upper transparent electrode 410 may be disposed on the first face 211 of the light refraction element 200, and the lower transparent electrode 420 may be disposed on the display panel 100. The first slanting face 221 and/or the second slanting face 222 may be partially or fully covered with the upper transparent electrode 410. The upper transparent electrode 410 may include a first upper transparent electrode 411, a second upper transparent electrode 412 and a third upper transparent electrode 413. The first upper transparent electrode 411 may be disposed on the first and second slanting faces 221 and 222 of the first recess area A, the second upper transparent electrode 412 may be disposed on the first and second slanting faces 221 and 222 of the second recess area B, and the third upper transparent electrode 413 may be disposed on the first and second slanting faces 221 and 222 of the third recess area C. The upper and lower transparent electrodes 410 and 420 may be formed by ITO (indium tin oxide), etc.

A light refraction regulating material 300 is disposed at the recess areas A, B and C. The light refraction regulating material 300 may include a first light refraction regulating material 310, a second light refraction regulating material 320 and a third light refraction regulating material 330. The first, second and third light refraction regulating materials 310, 320 and 330 may be the same material so that they have the same refractive index, or may be different from each other so that they have the different refractive index. The light refraction regulating material 300 may include liquid crystal, photochromic material, etc. In the present embodiment, the light refraction regulating material 300 includes the same light refraction regulating material, but it is not limited to this. Considering images (stereoscopic images) shown by the display device 10, the number and kind of the light refraction regulating materials can be selected moderately. The first light refraction regulating material 310 may be disposed at the first recess area A, the second light refraction regulating material 320 may be disposed at the second recess area B, and the third light refraction regulating material 330 may be disposed at the third recess area C. The recess areas A, B and C may be partially or fully filled with the refraction regulating material 300.

Figure 14:
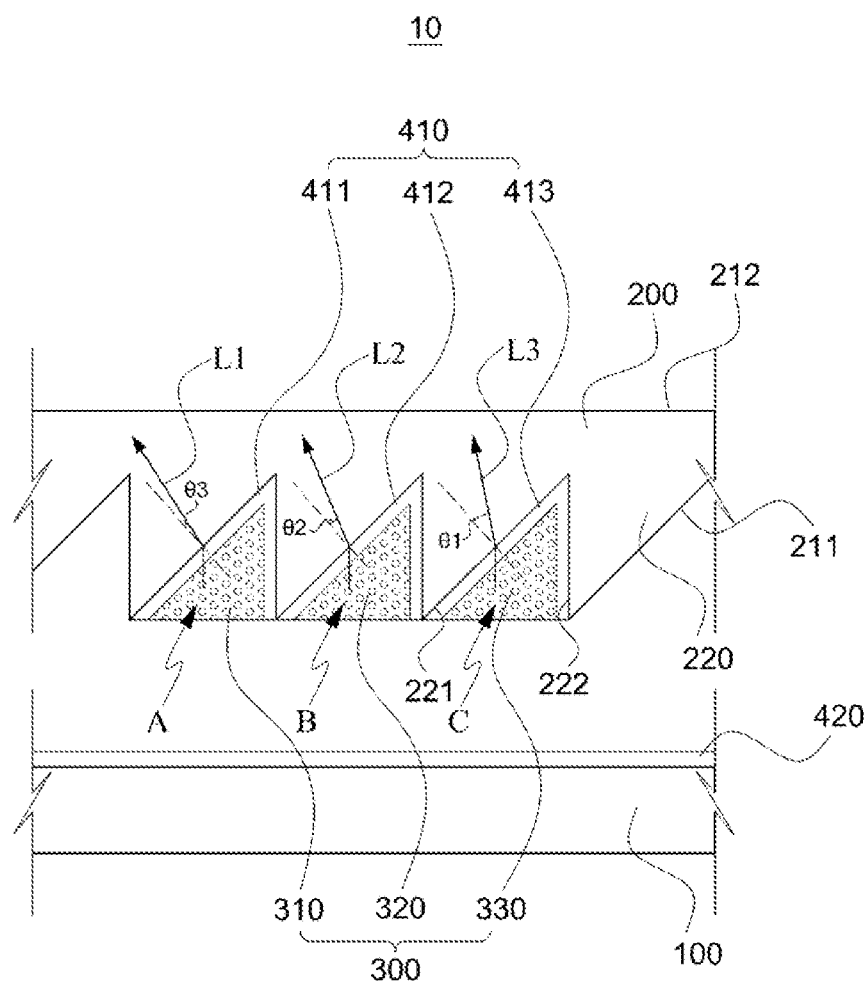
FIG. 14 is a cross sectional view schematically illustrating a display device according to yet another embodiment of the present invention.

The refractive index or refraction angle of the refraction regulating material 300 can be changed according to a control signal provided by the upper and lower transparent electrodes 410 and 420. For example, the control signal can change the arrangement of the liquid crystal included in the light refraction regulating material 300 or change the structure of the internal organization of the light refraction regulating material 300, so that it can change the refractive index or refraction angle of the refraction regulating material 300. The first, second and third light refraction regulating materials 310, 320 and 330 may be the same material so that they have the same refractive index even though that is not shown in drawings. Therefore, when the control signal is not provided, all of a first light L1 passing through the first light refraction regulating material 310, a second light L2 passing through the second light refraction regulating material 320 and a third light L3 passing through the third light refraction regulating material 330 may be refracted and travel in the same direction. But, when the control signal is provided, the first, second and third light L1, L2 and L3 may be refracted and travel in different directions. For example, the first light L1 may be refracted by the first slanting face 221 at a first refraction angle $\theta 1$, the second light L2 may be refracted by the first slanting face 221 at a second refraction angle $\theta 2$, and the third light L3 may be refracted by the first slanting face 221 at a third refraction angle $\theta 3$. Referring to FIG. 14, when the control signal is provided, the first light L1 may be refracted by the first slanting face 221 at the third refraction angle $\theta 3$, the second light L2 may be refracted by the first slanting face 221 at a second refraction angle $\theta 2$, and the third light L3 may be refracted by the first slanting face 221 at a first refraction angle $\theta 1$. In other words, the first, second and third light L1, L2 and L3 emerging from the display panel 100 are refracted by the light refraction regulating material 300 at different angles, and thus can generate stereoscopic images.

Figure 15:
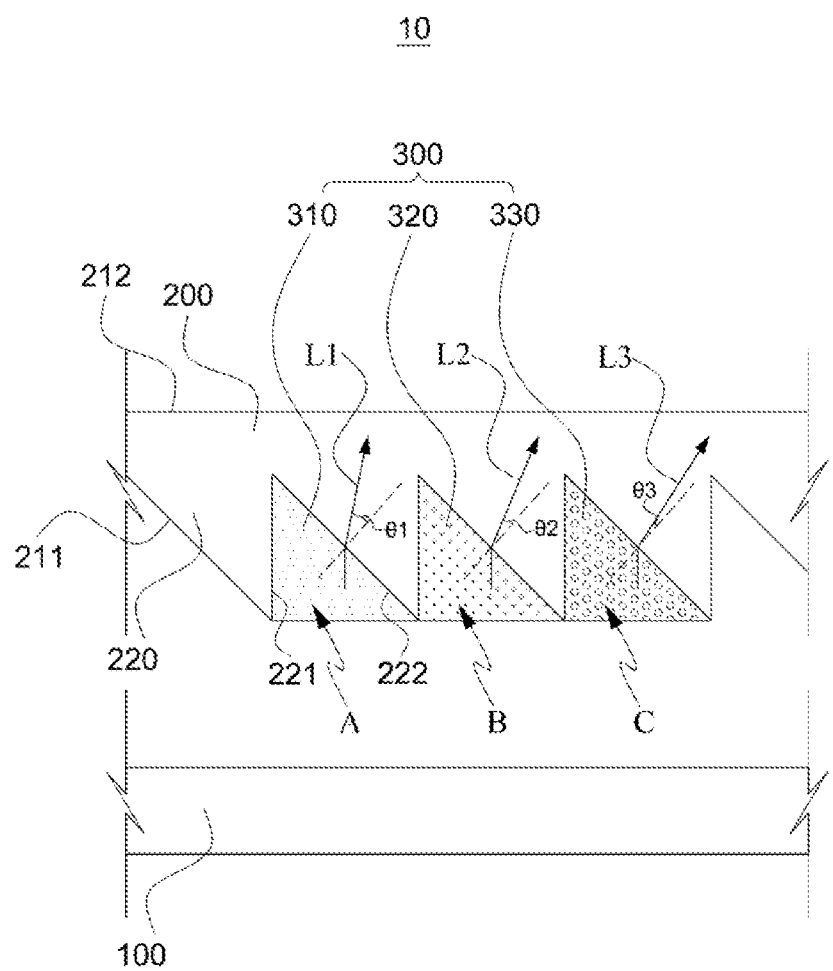
FIG. 15 is a cross sectional view schematically illustrating a display device according to yet another embodiment of the present invention.

FIG. 15 is a cross sectional view schematically illustrating a display device according to yet another embodiment of the present invention.

Referring to FIG. 15, the display device 10 may include a display panel 100, a light refraction element 200 and light refraction regulating material 300.

The display panel 100 may be a panel that can be used in various display devices such as a LCD device, a LED device, an OLED device, a PDP device, a projection display device and a holographic display device, etc.

The light refraction element 200 may have a first face 211 facing the display panel 100 and a second face 212 disposed at an opposite side of the first face 211. The light refraction element 200 may have a plurality of light refraction patterns 220 disposed at the first face 211. The light refraction pattern 220 may have a first slanting face 221 and a second slanting face 222. The first slanting face 221 may be perpendicular to the display panel 100, and the second slanting face 222 may make an acute angle with the display panel 100. In a direction where a plurality of the light refraction patterns 220 are arranged, a width of a cross section of the light refraction pattern 220 may become narrow towards the display panel 100. The cross section of the light refraction pattern 220 may be a right triangle. A plurality of recess areas (for example, a first recess area A, a second recess area B and a third recess area C) defined by the first slanting face 221 and the second slanting face 222 may be disposed at the first face 211. The light refraction element 200 may be an optical film as an example. In addition, the light refraction element 200 may be formed by PET, PMMA, poly(pentabromophenyl methacrylate), polythiomethacrylate, polycarbonate, a high molecular substance with a polarizing property and nanocomposite, etc. The nanocomposite may be formed by dispersing nanoparticles (for example, titanium dioxide nanoparticles) in a high molecule (for example, polyimide).

A light refraction regulating material 300 is disposed at the recess areas A, B and C. The light refraction regulating material 300 may include two or more kinds of light refraction regulating materials (for example, a first light refraction regulating material 310, a second light refraction regulating material 320 and a third light refraction regulating material 330) which are different from each other. The light refraction regulating material 300 may include ethanol, water, fluorocarbon, silicon oil, fluorine oil, liquid crystal, photochromic material, etc. In the present embodiment, the light refraction regulating material 300 includes three kinds of light refraction regulating materials, but it is not limited to this. Considering images (stereoscopic images) shown by the display device 10, the number and kind of the light refraction regulating materials can be selected moderately. The first light refraction regulating material 310 may be disposed at the first recess area A, the second light refraction regulating material 320 may be disposed at the second recess area B, and the third light refraction regulating material 330 may be disposed at the third recess area C. The recess areas A, B and C may be partially or fully filled with the refraction regulating material 300.

The light refraction regulating material 300 may refract light passing therethrough, and refractive indexes of the first light refraction regulating material 310, the second light refraction regulating material 320 and the third light refraction regulating material 330 may be different from each other. Therefore, the first light refraction regulating material 310, the second light refraction regulating material 320 and the third light refraction regulating material 330 can refract light at different angles and in different directions.

First, second and third light L1, L2 and L3 emerging from the display panel 100 pass through the light refraction element and form stereoscopic images. The first light L1 passes through the first light refraction regulating material 310 to be refracted by the second slanting face 222, the second light L2 passes through the second light refraction regulating material 320 to be refracted by the second slanting face 222, and the third light L3 passes through the third light refraction regulating material 330 to be refracted by the second slanting face 222. The first light L1 may be refracted by the second slanting face 222 at a first refraction angle $\theta 1$, the second light L2 may be refracted by the second slanting face 222 at a second refraction angle $\theta 2$, and the third light L3 may be refracted by the second slanting face 222 at a third refraction angle $\theta 3$. In other words, the first, second and third light L1, L2 and L3 emerging from the display panel 100 are refracted at different angles by the light refraction regulating material 300 in the light refraction element 200, and thus can generate stereoscopic images.

Figure 16:
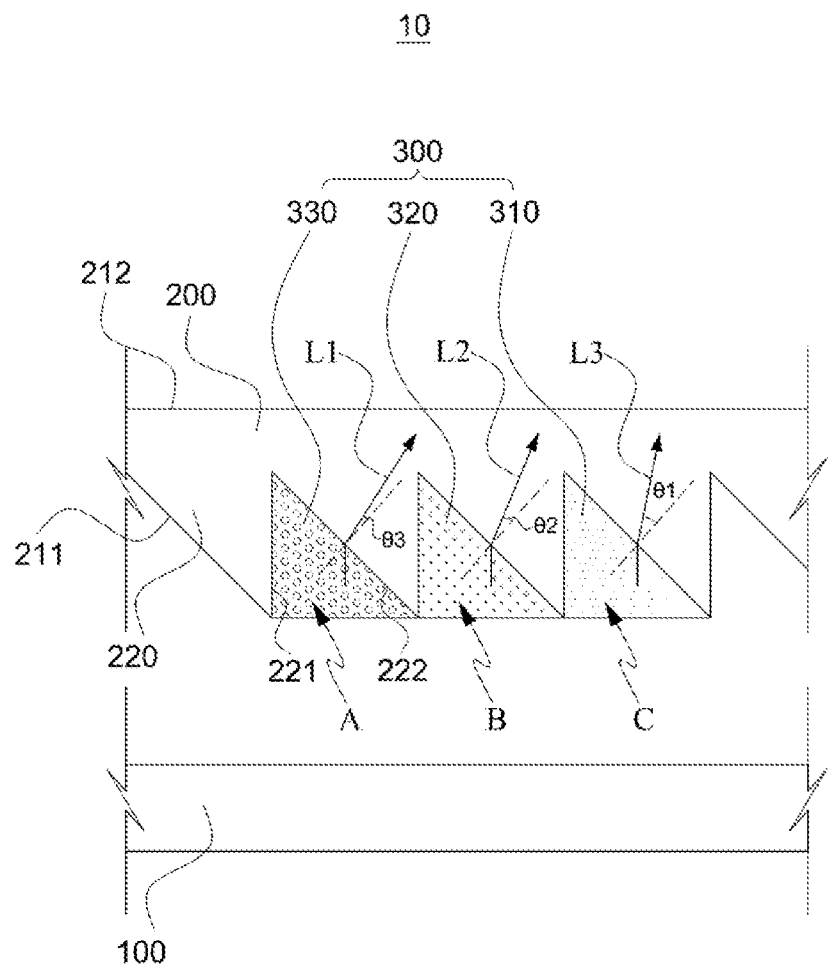
FIG. 16 is a cross sectional view schematically illustrating a display device according to yet another embodiment of the present invention.

FIG. 16 is a cross sectional view schematically illustrating a display device according to yet another embodiment of the present invention.

Referring to FIG. 16, the disposition of a light refraction regulating material 300 in the present embodiment may be different from that of the light refraction regulating material 300 in the previous embodiment. A first light refraction regulating material 310 may be disposed at a third recess area C, the second light refraction regulating material 320 may be disposed at the second recess area B, and the third light refraction regulating material 330 may be disposed at the first recess area A. The recess areas A, B and C may be partially or fully filled with the refraction regulating material 300.

The light refraction regulating material 300 may refract light passing therethrough, and refractive indexes of the first light refraction regulating material 310, the second light refraction regulating material 320 and the third light refraction regulating material 330 may be different from each other. Therefore, the first light refraction regulating material 310, the second light refraction regulating material 320 and the third light refraction regulating material 330 can refract light at different angles and in different directions.

First, second and third light L1, L2 and L3 emerging from the display panel 100 pass through the light refraction element and form stereoscopic images. The first light L1 passes through the third light refraction regulating material 330 to be refracted by the second slanting face 222, the second light L2 passes through the second light refraction regulating material 320 to be refracted by the second slanting face 222, and the third light L3 passes through the first light refraction regulating material 310 to be refracted by the second slanting face 222. The first light L1 may be refracted by the second slanting face 222 at a third refraction angle θ3, the second light L2 may be refracted by the second slanting face 222 at a second refraction angle θ2, and the third light L3 may be refracted by the second slanting face 222 at a first refraction angle θ1. In other words, the first, second and third light L1, L2 and L3 emerging from the display panel 100 are refracted at different angles by the light refraction regulating material 300 in the light refraction element 200, and thus can generate stereoscopic images.

Figure 17:
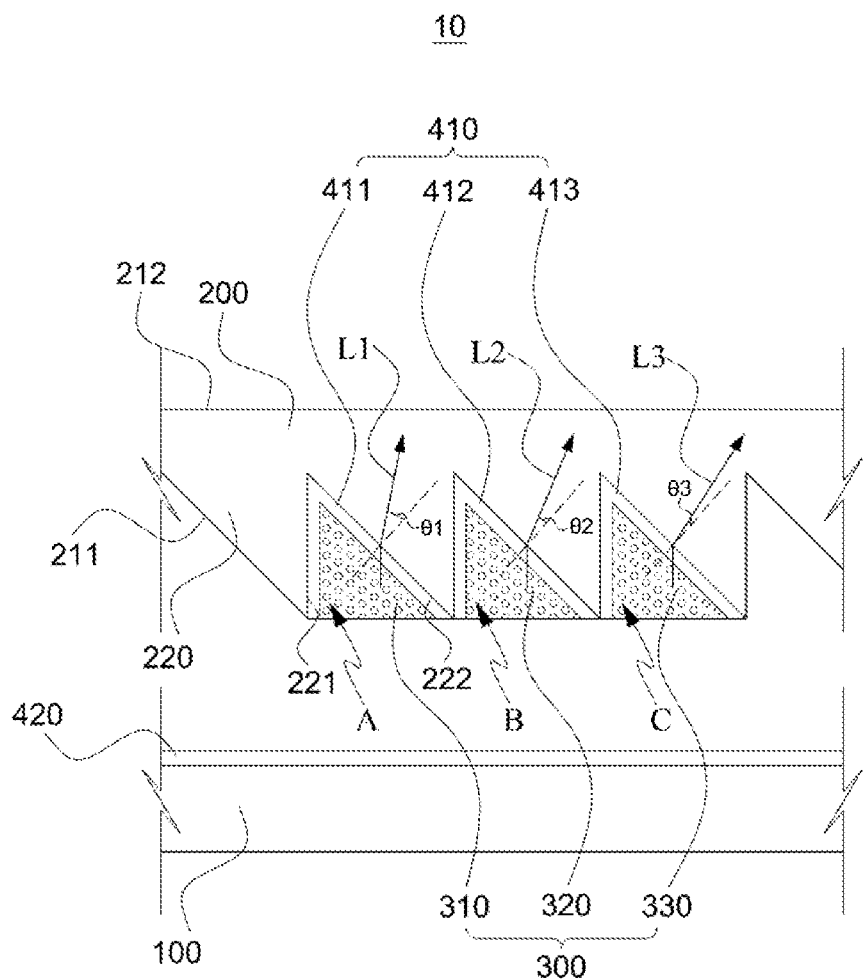
FIG. 17 is a cross sectional view schematically illustrating a display device according to yet another embodiment of the present invention.

FIG. 17 is a cross sectional view schematically illustrating a display device according to yet another embodiment of the present invention.

Referring to FIG. 17, a display device 10 may include a display panel 100, a light refraction element 200, light refraction regulating material 300, an upper transparent electrode 410 and a lower transparent electrode 420.

The display panel 100 may be a panel that can be used in various display devices such as a LCD device, a LED device, an OLED device, a PDP device, a projection display device and a holographic display device, etc.

The light refraction element 200 may have a first face 211 facing the display panel 100 and a second face 212 disposed at an opposite side of the first face 211. The light refraction element 200 may have a plurality of light refraction patterns 220 disposed at the first face 211. The light refraction pattern 220 may have a first slanting face 221 and a second slanting face 222. The first slanting face 221 may be perpendicular to the display panel 100, and the second slanting face 222 may make an acute angle with the display panel 100. In a direction where a plurality of the light refraction patterns 220 are arranged, a width of a cross section of the light refraction pattern 220 may become narrow towards the display panel 100. The cross section of the light refraction pattern 220 may be a right triangle. A plurality of recess areas (for example, a first recess area A, a second recess area B and a third recess area C) defined by the first slanting face 221 and the second slanting face 222 may be disposed at the first face 211. The light refraction element 200 may be an optical film as an example. In addition, the light refraction element 200 may be formed by PET (polyethylene terephthalate), PMMA (polymethyl methacrylate), poly (pentabromophenyl methacrylate), polythiomethacrylate, polycarbonate, a high molecular substance with a polarizing property and nanocomposite, etc. The nanocomposite may be formed by dispersing nanoparticles (for example, titanium dioxide nanoparticles) in a high molecule (for example, polyimide).

The upper transparent electrode 410 may be disposed on the first face 211 of the light refraction element 200, and the lower transparent electrode 420 may be disposed on the display panel 100. The first slanting face 221 and/or the second slanting face 222 may be partially or fully covered with the upper transparent electrode 410. The upper transparent electrode 410 may include a first upper transparent electrode 411, a second upper transparent electrode 412 and a third upper transparent electrode 413. The first upper transparent electrode 411 may be disposed on the first and second slanting faces 221 and 222 of the first recess area A, a second upper transparent electrode 412 may be disposed on the first and second slanting faces 221 and 222 of the second recess area B, and the third upper transparent electrode 413 may be disposed on the first and second slanting faces 221 and 222 of the third recess area C. The upper and lower transparent electrodes 410 and 420 may be formed by ITO (indium tin oxide), etc.

A light refraction regulating material 300 is disposed at the recess areas A, B and C. The light refraction regulating material 300 may include a first light refraction regulating material 310, a second light refraction regulating material 320 and a third light refraction regulating material 330. The first, second and third light refraction regulating materials 310, 320 and 330 may be the same material so that they have the same refraction index, or may be different from each other so that they have the different refractive index. The light refraction regulating material 300 may include liquid crystal, photochromic material, etc. In the present embodiment, the light refraction regulating material 300 includes the same light refraction regulating material, but it is not limited to this. Considering images (stereoscopic images) shown by the display device 10, the number and kind of the light refraction regulating materials can be selected moderately. The first light refraction regulating material 310 may be disposed at the first recess area A, the second light refraction regulating material 320 may be disposed at the second recess area B, and the third light refraction regulating material 330 may be disposed at the third recess area C. The recess areas A, B and C may be partially or fully filled with the refraction regulating material 300.

Figure 18:
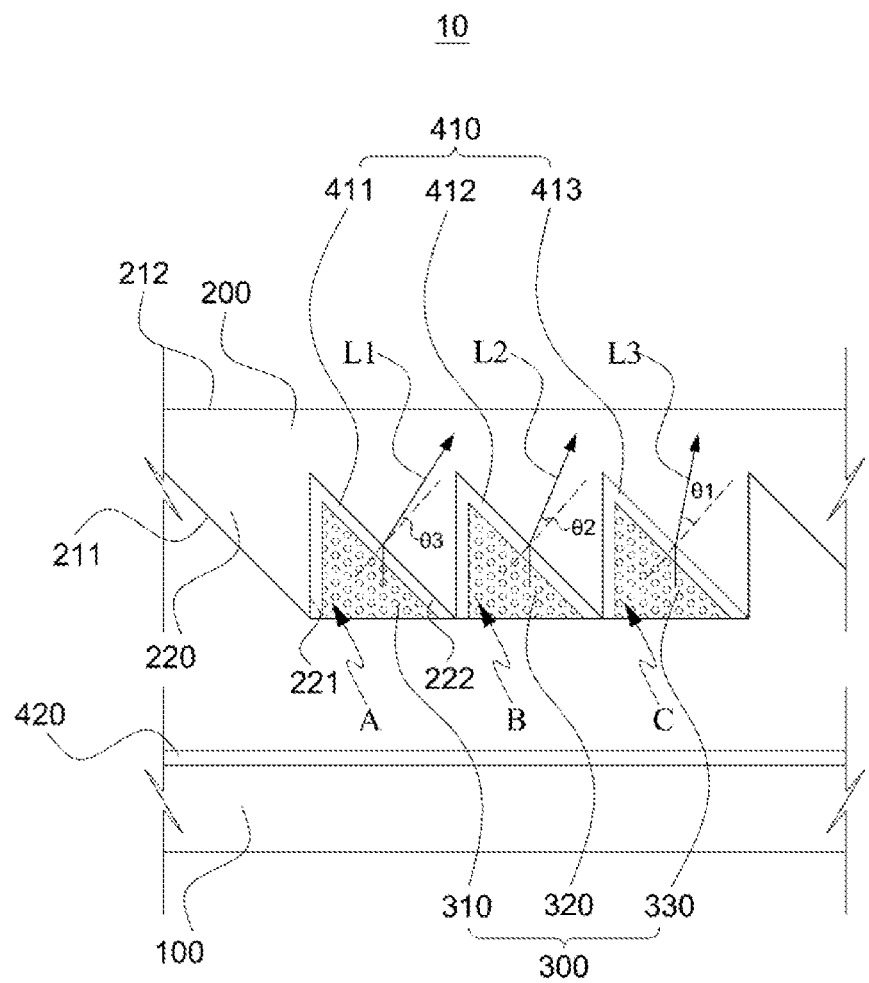
FIG. 18 is a cross sectional view schematically illustrating a display device according to yet another embodiment of the present invention.

The refractive index or refraction angle of the refraction regulating material 300 can be changed according to a control signal provided by the upper and lower transparent electrodes 410 and 420. For example, the control signal can change the arrangement of the liquid crystal included in the light refraction regulating material or change the structure of the internal organization of the light refraction regulating material, so that it can change the refractive index or refraction angle of the refraction regulating material 300. The first, second and third light refraction regulating materials 310, 320 and 330 may be the same material so that they have the same refraction index even though this is not shown in drawings. Therefore, when the control signal is not provided, all of a first light L1 passing through the first light refraction regulating material 310, a second light L2 passing through the second light refraction regulating material 320 and a third light L3 passing through the third light refraction regulating material 330 may be refracted and travel in the same direction. But, when the control signal is provided, the first, second and third light L1, L2 and L3 may be refracted and travel in different directions. For example, the first light L1 may be refracted by the second slanting face 222 at a first refraction angle θ1, the second light L2 may be refracted by the second slanting face 222 at a second refraction angle θ2, and the third light L3 may be refracted by the second slanting face 222 at a third refraction angle θ3. Referring to FIG. 18, when the control signal is provided, the first light L1 may be refracted by the second slanting face 222 at the third refraction angle θ3, the second light L2 may be refracted by the second slanting face 222 at a second refraction angle θ2, and the third light L3 may be refracted by the second slanting face 222 at a first refraction angle θ1. In other words, the first, second and third light L1, L2 and L3 emerging from the display panel 100 are refracted at different angles by the light refraction regulating material 300 in the light refraction element 200, and thus can generate stereoscopic images.

Figure 19:
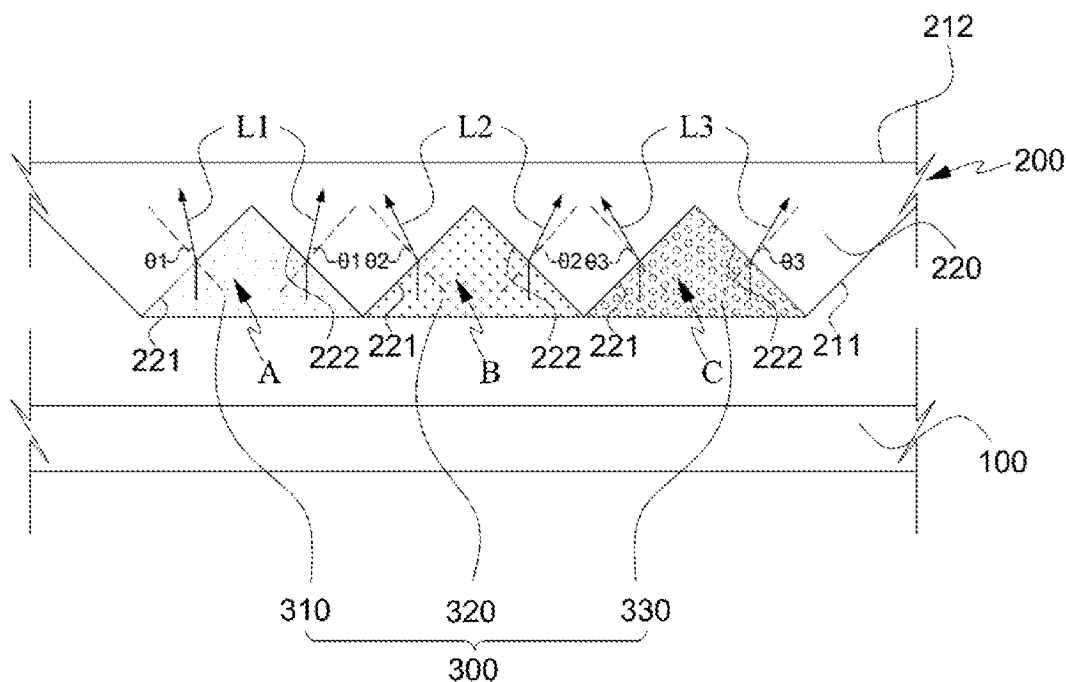
FIG. 19 is a cross sectional view schematically illustrating a display device according to yet another embodiment of the present invention.

FIG. 19 is a cross sectional view schematically illustrating a display device according to yet another embodiment of the present invention.

Referring to FIG. 19, a display device 10 may include a display panel 100, a light refraction element 200 and light refraction regulating material 300.

The display panel 100 may be a panel that can be used in various display devices such as a LCD device, a LED device, an OLED device, a PDP device, a projection display device and a holographic display device, etc.

The light refraction element 200 may have a first face 211 facing the display panel 100 and a second face 212 disposed at an opposite side of the first face 211. The light refraction element 200 may have a plurality of light refraction patterns 220 disposed at the first face 211. The light refraction pattern 220 may have a first slanting face 221 and a second slanting face 222. The first and second slanting faces 221 and 222 may make an acute angle with the display panel 100. In a direction where a plurality of the light refraction patterns 220 are arranged, a width of a cross section of the light refraction pattern 220 may become narrow towards the display panel 100. The cross section of the light refraction pattern 220 may be an isosceles triangle. A plurality of recess areas (for example, a first recess area A, a second recess area B and a third recess area C) defined by the first slanting face 221 and the second slanting face 222 may be disposed at the first face 211. The light refraction element 200 may be an optical film as an example. In addition, the light refraction element 200 may be formed by PET (polyethylene terephthalate), PMMA (polymethyl methacrylate), poly(pentabromophenyl methacrylate), polythiomethacrylate, polycarbonate, a high molecular substance with a polarizing property and nanocomposite, etc. The nanocomposite may be formed by dispersing nanoparticles (for example, titanium dioxide nanoparticles) in a high molecule (for example, polyimide).

A light refraction regulating material 300 is disposed at the recess areas A, B and C. The light refraction regulating material 300 may include two or more kinds of light refraction regulating materials (for example, a first light refraction regulating material 310, a second light refraction regulating material 320 and a third light refraction regulating material 330). The light refraction regulating material 300 may include ethanol, water, fluorocarbon, silicon oil, fluorine oil, liquid crystal, photochromic material, etc. In the present embodiment, the light refraction regulating material 300 includes three kinds of light refraction regulating materials, but it is not limited to this. Considering images (stereoscopic images) shown by the display device 10, the number and kind of the light refraction regulating materials can be selected moderately. The first light refraction regulating material 310 may be disposed at the first recess area A, the second light refraction regulating material 320 may be disposed at the second recess area B, and the third light refraction regulating material 330 may be disposed at the third recess area C. The recess areas A, B and C may be partially or fully filled with the refraction regulating material 300.

The light refraction regulating material 300 may refract light passing therethrough, and refractive indexes of the first light refraction regulating material 310, the second light refraction regulating material 320 and the third light refraction regulating material 330 may be different from each other. Therefore, the first light refraction regulating material 310, the second light refraction regulating material 320 and the third light refraction regulating material 330 can refract light at different angles and in different directions.

First, second and third light L1, L2 and L3 emerging from the display panel 100 pass through the light refraction element and form stereoscopic images. The first light L1 passes through the first light refraction regulating material 310 to be refracted by the first and second slanting faces 221 and 222, the second light L2 passes through the second light refraction regulating material 320 to be refracted by the first and second slanting faces 221 and 222, and the third light L3 passes through the third light refraction regulating material 330 to be refracted by the first and second slanting faces 221 and 222. The first light L1 may be refracted by the first and second slanting faces 221 and 222 at a first refraction angle θ1, the second light L2 may be refracted by the first and second slanting faces 221 and 222 at a second refraction angle θ2, and the third light L3 may be refracted by the first and second slanting faces 221 and 222 at a third refraction angle θ3. In other words, the first, second and third light L1, L2 and L3 emerging from the display panel 100 are refracted at different angles by the light refraction regulating material 300 in the light refraction element 200, and thus can generate stereoscopic images.

Figure 20:
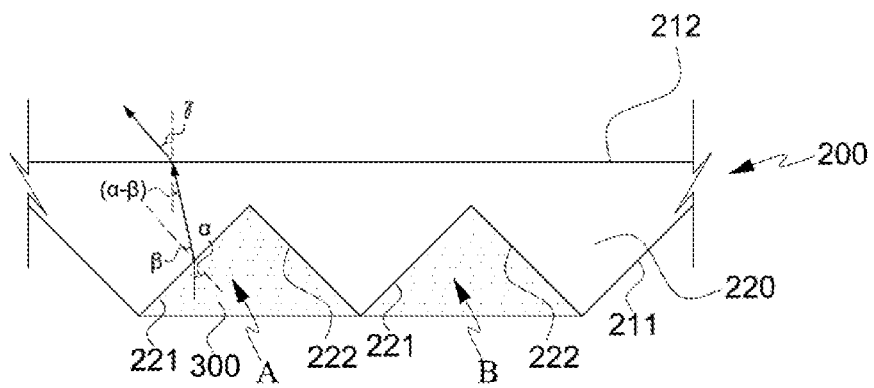
FIG. 20 is a view illustrating a refraction of light by a light refraction element according to embodiments of the present invention.

FIG. 20 is a view illustrating a refraction of light by a light refraction element according to embodiments of the present invention.

Referring to FIG. 20, light passing through a light refraction regulating material 300 is incident on a first slanting face 221 of a light refraction element 200 at an angle of incidence α and is refracted at an angle of refraction β. After the refraction, the light passes through the light refraction element 200 and emerges from a second face 212 of the light refraction element 200 at an angle of inclination γ. The angle of inclination γ of the light emerging from the second face 212 depends on the refractive index of the light refraction regulating material 300 and the inclined angle of the first slanting face 221. Therefore, various stereoscopic images can be shown by selecting materials whose kind and refractive index are different from each other as the light refraction regulating material 300 disposed at the recess areas A and B.

Figure 21:
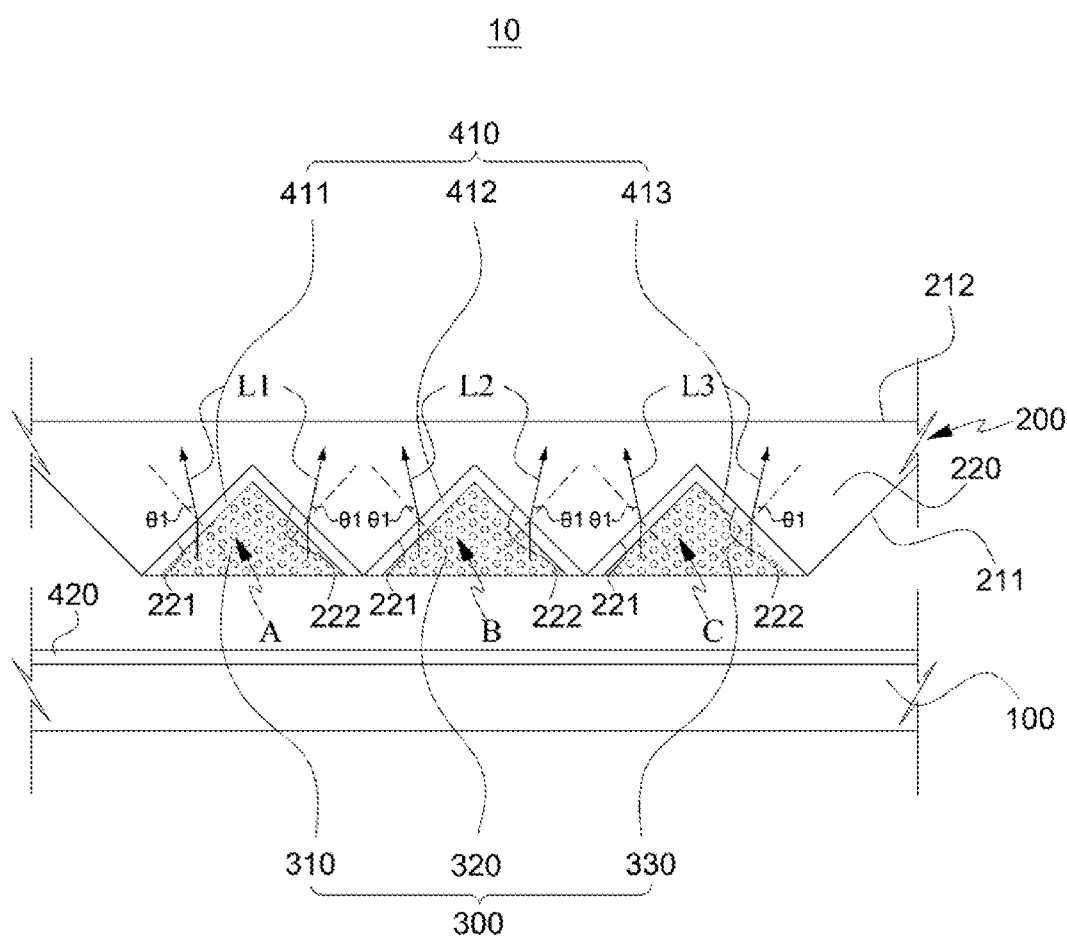
FIGS. 21 and 22 are cross sectional views schematically illustrating a display device according to yet another embodiment of the present invention.
Figure 22:
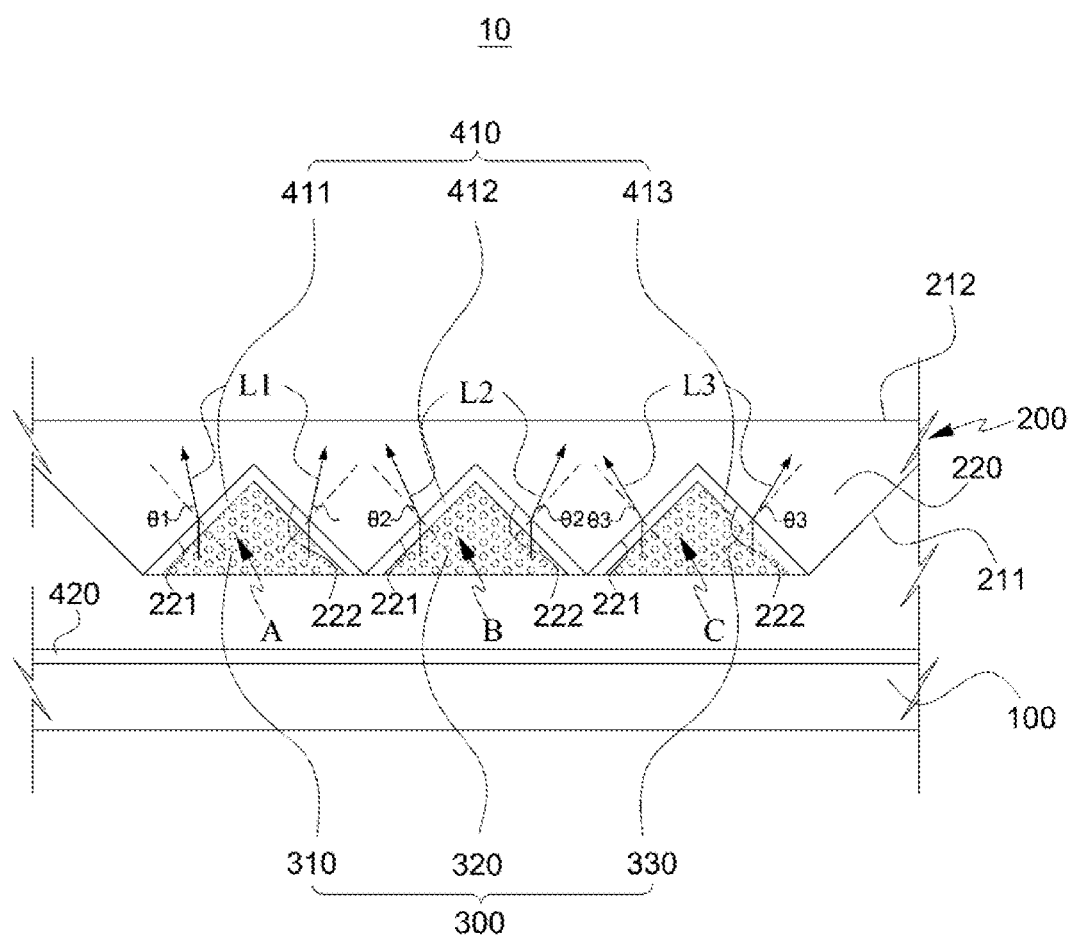

FIGS. 21 and 22 are cross sectional views schematically illustrating a display device according to yet another embodiment of the present invention.

Referring to FIGS. 21 and 22, a display device 10 may include a display panel 100, a light refraction element 200, light refraction regulating material 300, an upper transparent electrode and a lower transparent electrode.

The display panel 100 may be a panel that can be used in various display devices such as a LCD device, a LED device, an OLED device, a PDP device, a projection display device and a holographic display device, etc.

The light refraction element 200 may have a first face 211 facing the display panel 100 and a second face 212 disposed at an opposite side of the first face 211. The light refraction element 200 may have a plurality of light refraction patterns 220 disposed at the first face 211. The light refraction pattern 220 may have a first slanting face 221 and a second slanting face 222. The first slanting face 221 may make an acute angle with the display panel 100, and the second slanting face 222 may be perpendicular to the display panel 100. In a direction where a plurality of the light refraction patterns 220 are arranged, a width of a cross section of the light refraction pattern 220 may become narrow towards the display panel 100. The cross section of the light refraction pattern 220 may be a right triangle. A plurality of recess areas (for example, a first recess area A, a second recess area B and a third recess area C) defined by the first slanting face 221 and the second slanting face 222 may be disposed at the first face 211. The light refraction element 200 may be an optical film as an example. In addition, the light refraction element 200 may be formed by PET (polyethylene terephthalate), PMMA (polymethyl methacrylate), poly (pentabromophenyl methacrylate), polythiomethacrylate, polycarbonate, a high molecular substance with a polarizing property and nanocomposite, etc. The nanocomposite may be formed by dispersing nanoparticles (for example, titanium dioxide nanoparticles) in a high molecule (for example, polyimide).

The upper transparent electrode 410 may be disposed on the first face 211 of the light refraction element 200, and the lower transparent electrode 420 may be disposed on the display panel 100. The first slanting face 221 and/or the second slanting face 222 may be partially or fully covered with the upper transparent electrode 410. The upper transparent electrode 410 may include a first upper transparent electrode 411, a second upper transparent electrode 412 and a third upper transparent electrode 413. The first upper transparent electrode 411 may be disposed on the first and second slanting faces 221 and 222 of the first recess area A, the second upper transparent electrode 412 may be disposed on the first and second slanting faces 221 and 222 of the second recess area B, and the third upper transparent electrode 413 may be disposed on the first and second slanting faces 221 and 222 of the third recess area C. The upper and lower transparent electrodes 410 and 420 may be formed by ITO (indium tin oxide), etc.

A light refraction regulating material 300 is disposed at the recess areas A, B and C. The light refraction regulating material 300 may include a first light refraction regulating material 310, a second light refraction regulating material 320 and a third light refraction regulating material 330. The first, second and third light refraction regulating materials 310, 320 and 330 may be the same material so that they have the same refractive index, or may be different from each other so that they have the different refractive index. The light refraction regulating material 300 may include liquid crystal, photochromic material, etc. In the present embodiment, the light refraction regulating material 300 includes the same light refraction regulating material, but it is not limited to this. Considering images (stereoscopic images) shown by the display device 10, the number and kind of the light refraction regulating materials can be selected moderately. The first light refraction regulating material 310 may be disposed at the first recess area A, the second light refraction regulating material 320 may be disposed at the second recess area B, and the third light refraction regulating material 330 may be disposed at the third recess area C. The recess areas A, B and C may be partially or fully filled with the refraction regulating material 300.

The refractive index or refraction angle of the refraction regulating material 300 can be changed according to a control signal provided by the upper and lower transparent electrodes 410 and 420. For example, the control signal can change the arrangement of the liquid crystal included in the light refraction regulating material or change the structure of the internal organization of the light refraction regulating material, so that it can change the refractive index or refraction angle of the refraction regulating material 300.

Referring to FIG. 21, the first, second and third light refraction regulating materials 310, 320 and 330 may be the same material so that they have the same refractive index. Therefore, when the control signal is not provided, all of a first light L1 passing through the first light refraction regulating material 310, a second light L2 passing through the second light refraction regulating material 320 and a third light L3 passing through the third light refraction regulating material 330 may be refracted and travel in the same direction. For example, all of the first, second and third light L1, L2 and L3 emerging from the display panel 100 may be refracted by the first and second slanting faces 221 and 222 at a first refraction angle θ1. But, referring to FIG. 22, when the control signal is provided, the first, second and third light L1, L2 and L3 may be refracted and travel in different directions. For example, the first light L1 may be refracted by the first and second slanting faces 221 and 222 at a first refraction angle θ1, the second light L2 may be refracted by the first and second slanting faces 221 and 222 at a second refraction angle θ2, and the third light L3 may be refracted by the first and second slanting faces 221 and 222 at a third refraction angle θ3. In other words, the first, second and third light L1, L2 and L3 emerging from the display panel are refracted at different angles by the light refraction regulating material 300 in the light refraction element 200, and thus can generate stereoscopic images.

Figure 23:
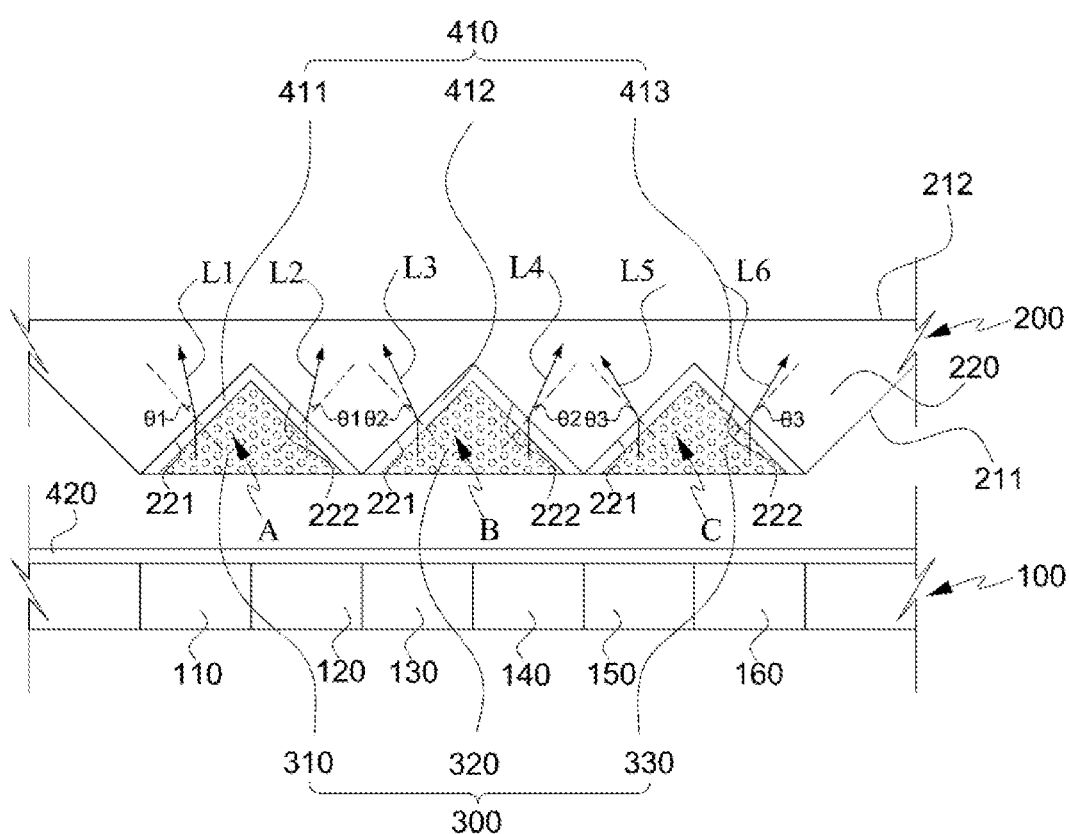
FIG. 23 is a cross sectional view schematically illustrating a display device according to yet another embodiment of the present invention.

FIG. 23 is a cross sectional view schematically illustrating a display device according to yet another embodiment of the present invention.

Referring to FIG. 23, a display panel 100 may include a plurality of pixel areas (for, example, a first pixel area 110, a second pixel area 120, a third pixel area 130, a fourth pixel area 140, a fifth pixel area 150 and a sixth pixel area 160).

When a control signal is provided by upper and lower transparent electrodes 410 and 420, first to sixth light L1, L2, L3, L4, L5 and L6 emerging from the first to sixth pixel areas 110, 120, 130, 140, 150 and 160 may be refracted and travel in different directions. The first light L1 emerging from the first pixel area 110 may pass through a first light refraction material 310, be refracted by a first slanting face 221 at by a first refraction angle θ1 and travel after the refraction. The second light L2 emerging from the second pixel area 120 may pass through the first light refraction material 310, be refracted by a second slanting face 222 at the first refraction angle θ1 and travel after the refraction. The third light L3 emerging from the third pixel area 130 may pass through a second light refraction material 320, be refracted by the first slanting face 221 at a second refraction angle θ2 and travel after the refraction. The fourth light L4 emerging from the fourth pixel area 140 may pass through the second light refraction material 320, be refracted by the second slanting face 222 at the second refraction angle θ2 and travel after the refraction. The fifth light L5 emerging from the fifth pixel area 150 may pass through a third light refraction material 330, be refracted by the first slanting face 221 at a third refraction angle θ3 and travel after the refraction. The sixth light L6 emerging from the sixth pixel area 160 may pass through the third light refraction material 330, be refracted by the second slanting face 222 at the second refraction angle θ2 and travel after the refraction. In other words, the first to six light L1, L2, L3, L4, L5 and L6 emerging from the display panel 100 are refracted at different angles by the light refraction regulating material 300 in the light refraction element 200, and thus can generate stereoscopic images.

Although the embodiments of the present invention have been disclosed for illustrative purposes, those skilled in the art will appreciate that the present invention may be embodied in other specific ways without changing the technical spirit or essential features thereof. Therefore, the embodiments disclosed in the present invention are not restrictive but are illustrative. The scope of the present invention is given by the claims, rather than the specification, and also contains all modifications within the meaning and range equivalent to the claims.

INDUSTRIAL APPLICABILITY

The display device according to embodiments of the present invention has simple structure and can be fabricated by simple manufacturing process. The display device can maintain its brightness and show stereoscopic or multi-view images by disposing a light refraction element with a light refraction pattern on the display panel. Since the light refraction element with the light refraction pattern has simple structure, it can be easily fabricated.

Furthermore, the display device can maintain its brightness and provide two or more images at different angles, and thus can easily show stereoscopic or multi-view images of high quality. The display device can be used for a glass-free type stereoscopic display device where users can watch stereoscopic images without glasses.

The invention claimed is:

1. A display device comprising:
 a display panel;
 a light refraction element disposed on the display panel, and having a first face facing the display panel and a second face disposed at an opposite side of the first face,
 light refraction regulating materials disposed at the first face of the light refraction element;
 an upper transparent electrode disposed between the first face of the light refraction element and the light refraction regulating material; and
 a lower transparent electrode disposed on the display panel,
 wherein the light refraction element comprises a light refraction pattern disposed at the first face and having a first slanting face and a second slanting face, and the light refraction pattern being configured to refract light emerging from the display panel,
 wherein recess areas are defined at the first face by the first and second slanting faces,
 wherein the recess areas comprise a first recess area and a second recess area and the light refraction regulating materials comprise a first light refraction regulating material disposed at the first recess area and a second light refraction regulating material disposed at the second recess area, and
 wherein the refractive index of the first light refraction regulating material and the refractive index of the second light refraction regulating material are different from each other.

2. The display device of claim 1, wherein a width of the light refraction pattern becomes narrow towards the display panel.

3. The display device of claim 2, wherein the light refraction pattern has a triangular cross section.

4. The display device of claim 1, wherein the display panel comprises a first pixel area disposed at a location corresponding to the first slanting face and a second pixel area disposed at a location corresponding to the second slanting face, and a first light emerging from the first pixel area is incident on the first slanting face and a second light emerging from the second pixel area is incident on the second slanting face.

5. The display device of claim 4, the first light and the second light which pass through the light refraction element and emerge from the second face are different in a direction.

6. The display device of claim 5, wherein the first light and the second light which pass through the light refraction element form 3D images or multi-view images.

7. The display device of claim 1, wherein the light refraction element comprises an optical film.

8. The display device of claim 1, wherein a recess area is defined at the first face by the first and second slanting faces, and the light refraction regulating material is disposed at the recess area.

9. The display device of claim 1, wherein a refractive index of the light refraction regulating material is changed according to a control signal provided by the upper and lower transparent electrodes.

10. The display device of claim 1, the light refraction regulating material adjusts a refraction angle and a refraction direction of the light according to a control signal provided by the upper and lower transparent electrodes.

11. A display device comprising:
 a display panel;
 a light refraction element disposed on the display panel, and having a first face facing the display panel and a second face disposed at an opposite side of the first face;
 light refraction regulating materials disposed at the first face of the light refraction element;
 an upper transparent electrode disposed between the first face of the light refraction element and the light refraction regulating material; and
 a lower transparent electrode disposed on the display panel,
 wherein the light refraction element comprises a light refraction pattern disposed at the first face and having a first slanting face and a second slanting face, and the light refraction pattern being configured to refract light emerging from the display panel,
 wherein the light refraction regulating material comprises a first light refraction regulating material and a second light refraction regulating material which are disposed at different locations of the first face,
 the first and second light refraction regulating materials make the light travel at different refraction angles and in different refraction directions according to a control signal provided by the upper and lower transparent electrodes, wherein recess areas are defined at the first face by the first and second slanting faces, wherein the recess areas comprise a first recess area and a second recess area and the light refraction regulating materials comprise a first light refraction regulating material disposed at the first recess area and a second light refraction regulating material disposed at the second recess area, and wherein the refractive index of the first light refraction regulating material and the refractive index of the second light refraction regulating material are different from each other.

\* \* \* \* \*